US010769987B2

(12) United States Patent
Lee et al.

(10) Patent No.: US 10,769,987 B2
(45) Date of Patent: Sep. 8, 2020

(54) DISPLAY DEVICE

(71) Applicant: SAMSUNG DISPLAY CO., LTD., Yongin-si, Gyeonggi-do (KR)

(72) Inventors: Seung Kyu Lee, Yongin-si (KR); Tae Hoon Kwon, Yongin-si (KR); Min Ku Lee, Yongin-si (KR); Ji Hyun Ka, Yongin-si (KR); Jin Tae Jeong, Yongin-si (KR); Seung Ji Cha, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/439,133

(22) Filed: Feb. 22, 2017

(65) Prior Publication Data

US 2017/0352311 A1 Dec. 7, 2017

(30) Foreign Application Priority Data

Jun. 1, 2016 (KR) ........................ 10-2016-0068357

(51) Int. Cl.

| | |
|---|---|
| ***G06F 1/00*** | (2006.01) |
| ***G09G 3/3225*** | (2016.01) |
| ***G09G 3/3233*** | (2016.01) |
| ***G09G 3/3266*** | (2016.01) |
| ***G09G 3/36*** | (2006.01) |

(52) U.S. Cl.

CPC ......... *G09G 3/3225* (2013.01); *G09G 3/3233* (2013.01); *G09G 3/3266* (2013.01); *G09G 3/3648* (2013.01); *G09G 2300/0439* (2013.01); *G09G 2310/0286* (2013.01); *G09G 2310/08* (2013.01); *G09G 2320/0223* (2013.01); *G09G 2320/0233* (2013.01)

(58) Field of Classification Search

CPC .. G09G 3/20; G09G 3/36; G09G 3/30; G09G 3/3648; G09G 3/3225; G09G 3/22

See application file for complete search history.

(56) References Cited

U.S. PATENT DOCUMENTS

2009/0115795 A1 5/2009 Pae et al.
2010/0156945 A1* 6/2010 Yoshida ................ G02F 1/1345 345/690
2010/0201666 A1* 8/2010 Tobita .................. G09G 3/3677 345/208
2016/0005346 A1 1/2016 Kim
2016/0042684 A1* 2/2016 Kim ....................... G11C 19/28 345/212
2016/0284297 A1* 9/2016 Cheng .................. G09G 3/3648

FOREIGN PATENT DOCUMENTS

EP 3246911 A1 11/2017
KR 10-1281681 B1 7/2013

* cited by examiner

*Primary Examiner* — Michael A Faragalla

(74) *Attorney, Agent, or Firm* — Kile Park Reed & Houtteman PLLC

(57) ABSTRACT

A display device includes first pixels in a first pixel region and connected to first scan lines and second pixels in a second pixel region connected to second scan lines. The second pixel has a width less than the first pixel region. The display device also includes a first scan driver to supply first scan signals to the first scan lines, a second scan driver to supply second scan signals to the second scan lines, a first signal line to supply a first driving signal to the first scan driver and the second scan driver, and a signal delay circuit connected to the first signal line to delay the first driving signal.

25 Claims, 15 Drawing Sheets

DISPLAY DEVICE

CROSS-REFERENCE TO RELATED APPLICATION

Korean Patent Application No. 10-2016-0068357, filed on Jun. 1, 2016, and entitled, "Display Device," is incorporated by reference herein in its entirety.

BACKGROUND

1. Field

One or more embodiments described herein relate to a display device.

2. Description of the Related Art

A variety of displays have been developed. Examples include liquid crystal displays and organic light emitting displays. The pixels of these and other types of displays are connected to driving wiring lines for displaying an image. The driving wiring lines may have different loads based on position. As a result, brightness deviation may occur among the pixels.

SUMMARY

In accordance with one or more embodiments, a display device includes first pixels in a first pixel region and connected to first scan lines; second pixels in a second pixel region having a width less than the first pixel region, the second pixels connected to second scan lines; a first scan driver to supply first scan signals to the first scan lines; a second scan driver to supply second scan signals to the second scan lines; a first signal line to supply a first driving signal to the first scan driver and the second scan driver; and a signal delay circuit connected to the first signal line to delay the first driving signal.

The signal delay circuit may operate while the second scan signals are supplied. A number of second pixels in horizontal lines of the second pixel region may be less than a number of first pixels in horizontal lines of the first pixel region. A length of the second scan lines may be less than a length of the first scan lines. The first driving signal may include at least one clock signal.

The first signal line may include a first clock signal line and a second clock signal line, and the first clock signal line and the second clock signal line may be connected to the signal delay circuit. The signal delay circuit may include a signal delay circuit element; and a signal delay control transistor to control electrical connection between the signal delay circuit element and the first signal line. The signal delay circuit element may include at least one of a resistor or a capacitor.

The signal delay control transistor may turn on and off based on a control signal from a timing controller. The signal delay control transistor may maintain an on state in a first period in which the second scan signals are supplied and may maintain an off state in a second period in which the first scan signals are supplied. The first scan driver may supply the first scan signals to the first scan lines based on the first driving signal in the second period, and the second scan driver may supply the second scan signals to the second scan lines based on the first driving signal delayed in the first period.

The display device may include third pixels in a third pixel region and connected to third scan lines; and a third scan driver, connected to the first signal line, to receive the first driving signal and to supply third scan signals to the third scan lines. The third pixel region may have a width less than the first pixel region, and the second pixel region and the third pixel region may be at one side of the first pixel region and separate from each other. The signal delay control transistor may maintain an on state in a first period in which the second scan signals and the third scan signals are supplied and may maintain an off state in a second period in which the first scan signals are supplied.

In accordance with one or more other embodiments, a display device includes first pixels in a first pixel region and connected to first scan lines; second pixels in a second pixel region having a width less than the first pixel region, the second pixels are connected to second scan lines; third pixels in a third pixel region having a width less than the second pixel region, the third pixels connected to third scan lines; a first scan driver to supply first scan signals to the first scan lines; a second scan driver to supply second scan signals to the second scan lines; a third scan driver to supply third scan signals to the third scan lines; a first signal line to supply a first driving signal to the first scan driver, the second scan driver, and the third scan driver; and a first signal delay circuit and a second signal delay circuit connected to the first signal line to delay the first driving signal.

The first signal delay circuit and the second signal delay circuit may operate in a first period in which the third scan signals are supplied. The first signal delay circuit may operate and the second signal delay circuit may stop operating in a second period in which the second scan signals are supplied. A number of third pixels in horizontal lines of the third pixel region may be less than a number of second pixels in horizontal lines of second pixel region, and a number of second pixels in horizontal lines of the second pixel region may be less than a number of first pixels provided in horizontal lines of the first pixel region. A length of the third scan lines may be less than a length of the second scan lines, and length of the second scan lines may be less than a length of the first scan lines.

The first signal delay circuit may include a first signal delay circuit element and a first signal delay control transistor to control electrical connection between the first signal delay circuit element and the first signal line, and the second signal delay circuit may include a second signal delay circuit element and a second signal delay control transistor to control electrical connection between the second signal delay element and the first signal line.

Each of the first signal delay circuit element and the second signal delay circuit element may include at least one of a resistor or a capacitor. The first signal delay control transistor and the second signal delay control transistor may maintain on states in a first period in which the third scan signals are supplied. The first signal delay control transistor may maintain an on state and the second signal delay control transistor may maintain an off state in a second period in which the second scan signals are supplied.

The first signal delay control transistor and second signal delay control transistor may maintain off states in a third period in which the first scan signals are supplied. The first period, the second period, and the third period may be sequential periods.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
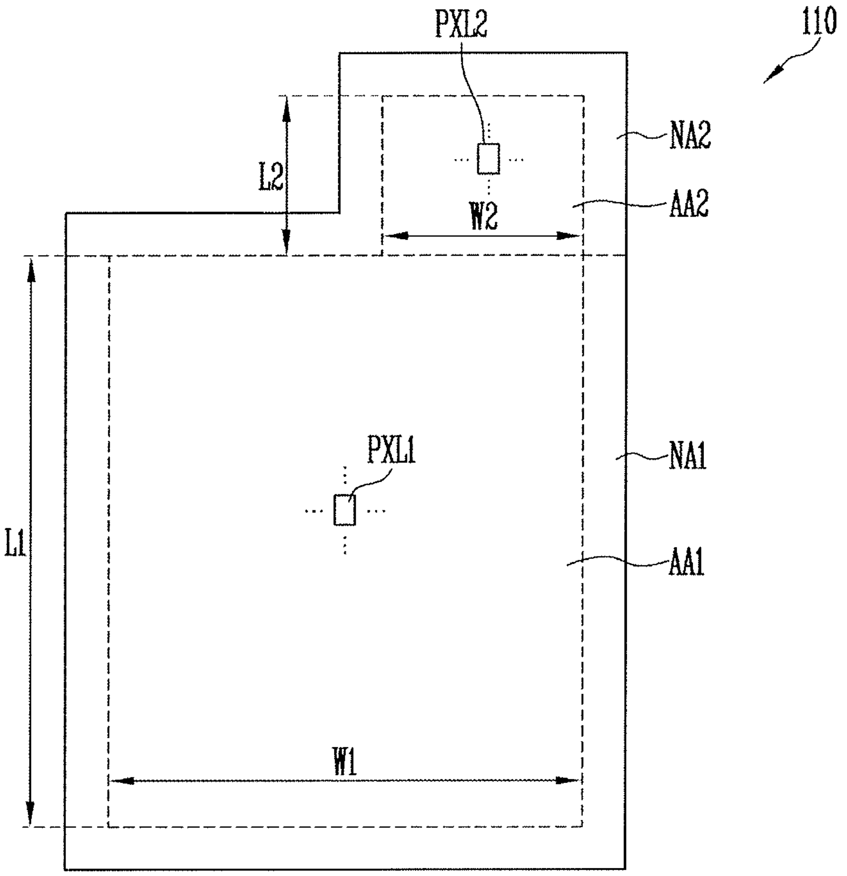
FIG. 1 illustrates an embodiment of a substrate.

Example embodiments will now be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates ab embodiment of a substrate 110 which may include pixel regions AA1 and AA2 and peripheral regions NA1 and NA2. A plurality of pixels PXL1 and PXL2 are in the pixel regions AA1 and AA2 to display a predetermined image. Therefore, the pixel regions AA1 and AA2 may be referred to as display regions.

Elements (for example, wiring lines) for driving the pixels PXL1 and PXL2 may be in the peripheral regions NA1 and NA2. Since the pixels PXL1 and PXL2 are not in the peripheral regions NA1 and NA2, the peripheral regions NA1 and NA2 may be referred to as non-display regions. For example, the peripheral regions NA1 and NA2 may exist outside the pixel regions AA1 and AA2 and may surround at least parts of the pixel regions AA1 and AA2.

The pixel regions AA1 and AA2 may include a first pixel region AA1 and a second pixel region AA2 at one side of the first pixel region AA1. The first pixel region AA1 may have a larger area than the second pixel region AA2. The width W1 of the first pixel region AA1 may be greater than the width W2 of the second pixel region AA2. The length L1 of the first pixel region AA1 may be greater than the length L2 of the second pixel region AA2.

The peripheral regions NA1 and NA2 may include a first peripheral region NA1 and a second peripheral region NA2. The first peripheral region NA1 may be around the first pixel region AA1 and may surround at least part of the first pixel region AA1. The second peripheral region NA2 may be around the second pixel region AA2 and surround part of the first pixel region AA1 and at least a part of second pixel region AA2.

The pixels PXL1 and PXL2 may include first pixels PXL1 and second pixels PXL2. For example, the first pixels PXL1 are in the first pixel region AA1 and the second pixels PXL2 may be in the second pixel region AA2. The pixels PXL1 and PXL2 may emit light with predetermined brightness based on control signals output from one or more drivers. For this purpose, each of the pixels PXL1 and PXL2 may include a light emitting device (for example, an organic light emitting diode (OLED)).

On the other hand, in the first pixel region AA1, the same number of first pixels PXL1 may be in each horizontal line. In addition, in the second pixel region AA2, the same number of second pixels PXL2 may be in each horizontal line.

As described above, since the width W1 of the first pixel region AA1 is greater than the width W2 of the second pixel region AA2, the number of first pixels PXL1 in the horizontal lines of the first pixel region AA1 may be greater than the number of second pixels PXL2 in the horizontal lines of the second pixel region AA2.

The substrate 110 may have various shapes so that the above-described pixel regions AA1 and AA2 and peripheral regions NA1 and NA2 may be set. For example, in FIG. 1, a protrusion may extend from an upper portion of the substrate 110 in one direction. In this case, the second pixel region AA2 and the second peripheral region NA2 may be defined in the protrusion of the substrate 110.

The substrate 110 may be formed of an insulating material such as glass and resin. In addition, the substrate 110 may be formed of a flexible material so as to be bent or curved and may has a single layer structure or a multilayer structure. For example, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, or celluloseacetate propionate. The substrate 110 may be formed of various materials such as fiber glass reinforced plastic (FRP).

Figure 2:
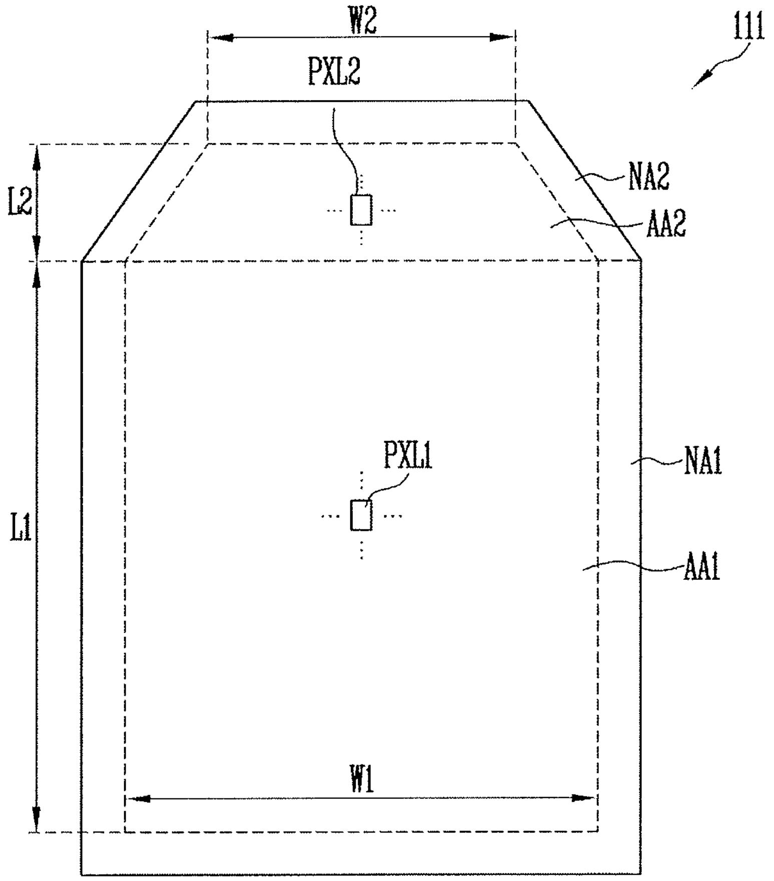
FIG. 2 illustrates another embodiment of a substrate.

FIG. 2 illustrates another embodiment of a substrate 111 which may include pixel regions AA1 and AA2 and peripheral regions NA1 and NA2. The pixel regions AA1 and AA2 may include a first pixel region AA1 and a second pixel region AA2 positioned at one side of the first pixel region AA1. The first pixel region AA1 may have a greater area than the second pixel region AA2.

The second pixel region AA2 may have a width that gradually reduces from one side adjacent to the first pixel region AA1 to the other side remote from the first pixel region AA1. For example, the width W2 of the other side of the second pixel region AA2 may be less than the width W1 of the first pixel region AA1. Also, the length L2 of the second pixel region AA2 may be less than the length L1 of first pixel region AA1.

The peripheral regions NA1 and NA2 may include a first peripheral region NA1 and a second peripheral region NA2. The first peripheral region NA1 may be around the first pixel region AA1 and may surround at least part of the first pixel region AA1. The second peripheral region NA2 may be around the second pixel region AA2 and may surround part of first pixel region AA1 and at least part of the second pixel region AA2.

The pixels PXL1 and PXL2 may include first pixels PXL1 and second pixels PXL2. For example, the first pixels PXL1 are in the first pixel region AA1 and the second pixels PXL2 may be in the second pixel region AA2. In the first pixel region AA1, the same number of first pixels PXL1 may be in each horizontal line. In the second pixel region AA2, the number of second pixels PXL2 in each horizontal line may vary. For example, in the second pixel region AA2, a greater number of second pixels PXL2 may be arranged in a horizontal line closer to the first pixel region AA1.

On the other hand, in FIG. 2, the second pixel region AA2 may be formed in an upper portion of the substrate 111. In another embodiment, the second pixel region AA2 may be formed in a lower portion of the substrate 111 or in both upper and lower portions of the substrate 111. In addition, the second pixel region AA2 may be connected to a part of an upper side of the first pixel region AA1.

Figure 3:
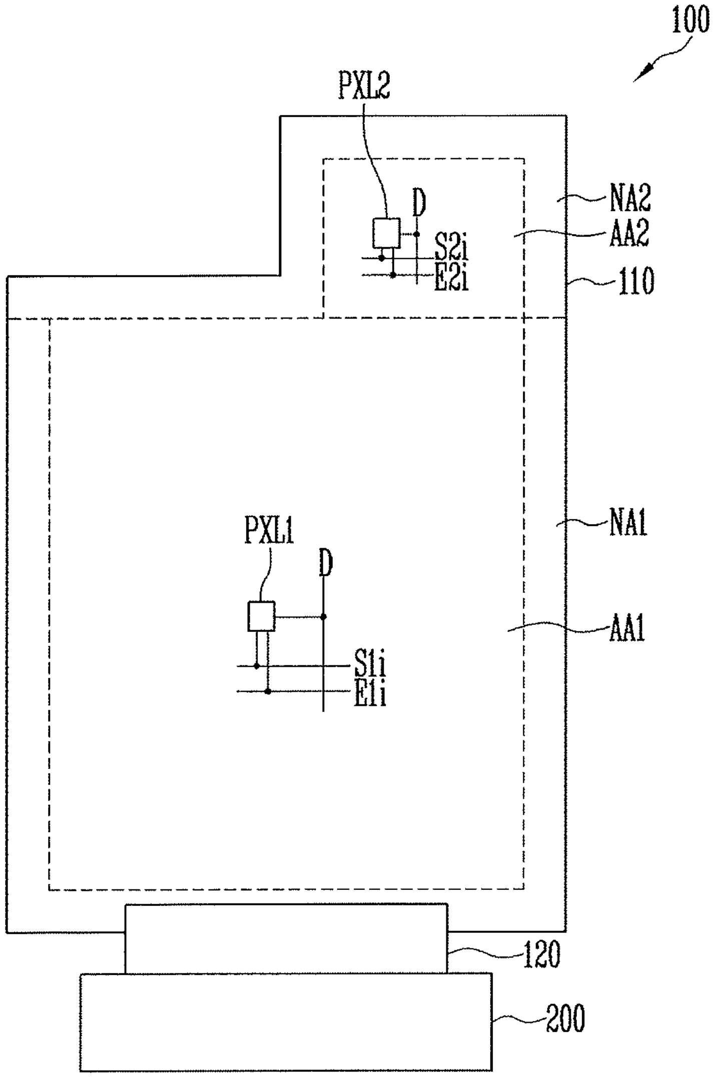
FIG. 3 illustrates an embodiment of a display device.

FIG. 3 illustrates an embodiment of a display device 100 which includes the substrate of FIG. 1. Referring to FIG. 3, the display device 100 may include the substrate 110, the first pixels PXL1, the second pixels PXL2, and a display driver 200.

The first pixels PXL1 are in the first pixel region AA1 and each of the first pixels PXL1 may be connected to a first scan line S1*i*, a first emission control line E1*i*, and a data line D.

The second pixels PXL2 are positioned in the second pixel region AA2 and each of the second pixels PXL2 may be connected to a second scan line S2*i*, a second emission control line E2*i*, and a data line D.

The data lines D connected to the second pixels PXL2 may extend from the data lines D connected to the first pixels PXL1. On the other hand, according to the present invention, i is a natural number and, for example, reference numeral S1*i* denotes an ith first scan line among first scan lines.

The display driver 200 may be connected to the substrate 110 through an additional element 120 such as a flexible printed circuit board (FPCB). For example, the display driver 200 may be connected to the substrate 110 by various methods such as a chip-on-glass method, a chip-on-plastic method, a tape carrier package method, or a chip-on-film method.

The display driver 200 may include drivers for controlling the pixels PXL1 and PXL2 to emit light. For example, the display driver 200 may include a scan driver for supplying scan signals to the ith first scan line S1*i* and the ith second scan line S2*i*. In addition, the display driver 200 may include an emission control driver for supplying emission control signals to the ith first emission control line E1*i* and the ith second emission control line E2*i*.

A data driver for supplying data signals to the pixels PXL1 and PXL2 through the data lines D may be in the display driver 200.

In FIG. 3, the display driver 200 is separate from the substrate 110 is connected to the substrate 110. In another embodiment, the entire display driver 200 or part of the display driver 200 may be directly mounted on the substrate 110 or may be in the first peripheral region NA1 and the second peripheral region NA2 of the substrate 110. In this case, the drivers may be formed on the substrate 110 by the various methods such as the chip-on-glass method, the chip-on-plastic method, the tape carrier package method, or the chip-on-film method.

Figure 4:
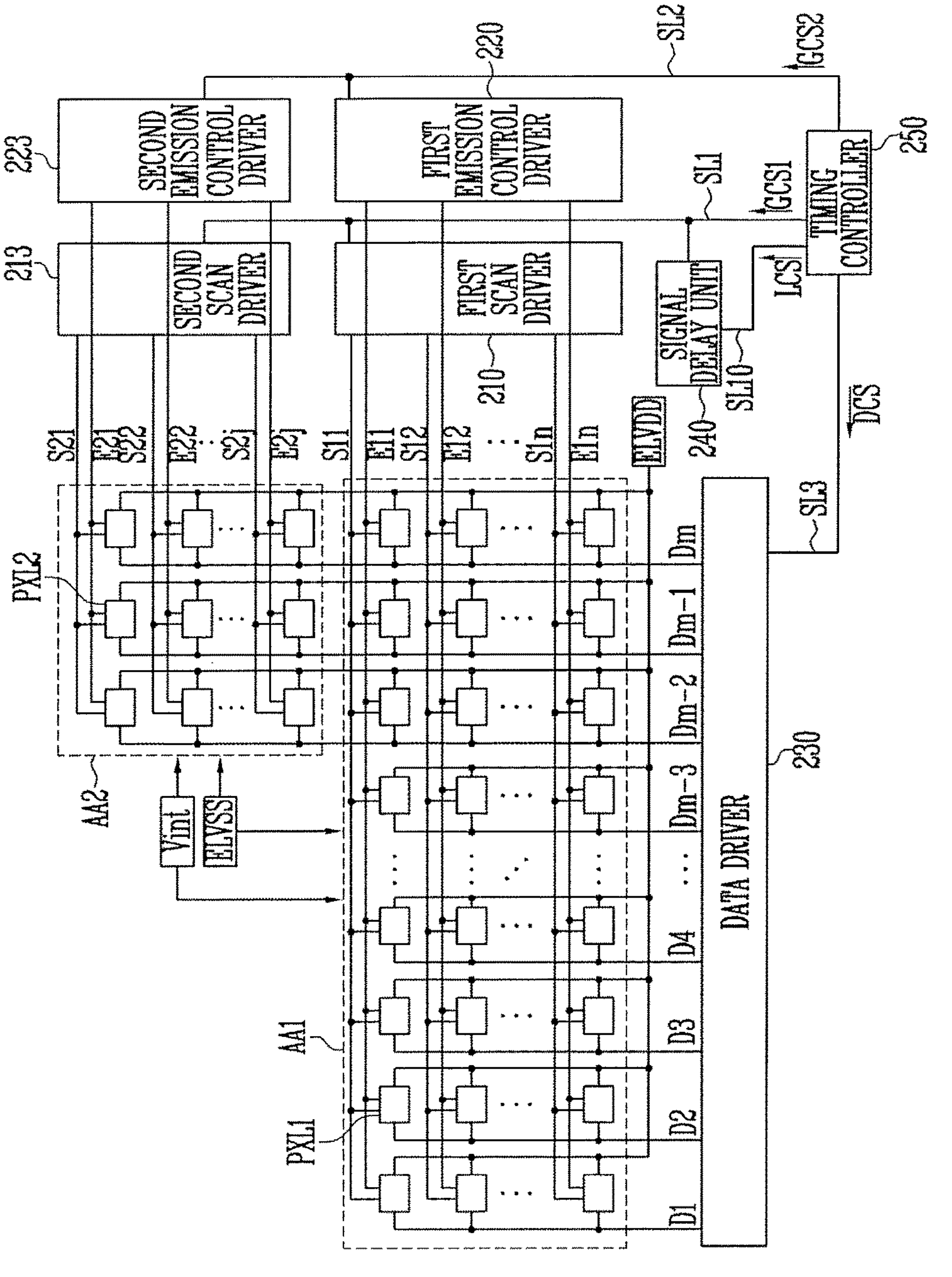
FIG. 4 illustrates another embodiment of a display device.

FIG. 4 illustrates another embodiment of a display device which may include the first pixels PXL1, the second pixels PXL2, and the display driver 200. The display driver 200 may include a first scan driver 210, a first emission control driver 220, a second scan driver 213, a second emission control driver 223, a data driver 230, a signal delay unit 240, and a timing controller 250.

The first pixels PXL1 are in the first pixel region AA1 divided by first scan lines S11 through S1*n*, first emission control lines E11 through E1*n*, and data lines D1 through Dm. The first pixels PXL1 receive data signals from the data lines D1 through Dm when scan signals are supplied from the first scan lines S11 through S1*n*. The first pixels PXL1 that receive the data signals control the amount of current that flows from a first power source ELVDD to a second power source ELVSS via organic light emitting diodes (OLED).

The second pixels PXL2 are in the second pixel region AA2 divided by second scan lines S21 through S2*j*, second emission control lines E21 through E2*j*, and data lines Dm-2 through Dm. The second pixels PXL2 receive data signals from the data lines Dm-2 through Dm when scan signals are supplied from the second scan lines S21 through S2*j*. The second pixels PXL2 that receive the data signals control the amount of current that flows from the first power source ELVDD to the second power source ELVSS via the OLEDs.

The first scan driver 210 supplies the scan signals to the first scan lines S11 through S1*n* based on a first gate control signal GCS1 from the timing controller 250. For example, the first scan driver 210 may sequentially supply the scan signals to the first scan lines S11 through S1*n*. When the scan signals are sequentially supplied to the first scan lines S11 through S1*n*, the first pixels PXL1 are sequentially selected in units of horizontal lines.

The second scan driver 213 supplies the scan signals to the second scan lines S21 through S2*j* based on the first gate control signal GCS1 from the timing controller 250. For example, the second scan driver 213 may sequentially supply the scan signals to the second scan lines S21 through S2*j*.

When the scan signals are sequentially supplied to the second scan lines S21 through S2*j*, the second pixels PXL2 are sequentially selected in units of horizontal lines. For example, in the display device 100, the second pixels PXL2 are sequentially selected in units of horizontal lines. Then, the first pixels PXL1 are sequentially selected in units of horizontal lines.

Loads of the first scan lines S11 through S1*n* may be different from loads of the second scan lines S21 through S2*j*. For example, since a width W1 of the first pixel region AA1 is larger than a width W2 of the second pixel region AA2, the lengths of the first scan lines S11 through S1*n* may be greater than the lengths of the second scan lines S21 through S2*j*. Thus, the number of second pixels PXL2 connected to one of the second scan lines S21 through S2*j* may be less than the number of first pixels PXL1 connected to one of the first scan lines S11 through S1*n*. Therefore, the loads of the first scan lines S11 through S1*n* may be greater than the loads of the second scan lines S21 through S2*j*.

As a result, a difference in time constant may be generated between the scan signals supplied to the first pixels PXL1 and the scan signals supplied to the second pixels PXL2. For example, the scan signals supplied to the first scan lines S11 through S1*n* have larger delay than the scan signals supplied to the second scan lines S21 through S2*j*. In this case, time for which the data signals are written in the first pixels PXL1 selected by the scan signals supplied to the first scan lines S11 through S1*n* is less than time for which the data signals are written in the second pixels PXL2 selected by the scan signals supplied to the second scan lines S21 through S2*j*. As a result, a brightness difference between the first pixels PXL1 and the second pixels PXL2 may be generated due to the difference in time constant between the scan signals.

The display driver 200 according to the embodiment may further include the signal delay unit 240. The signal delay unit 240 may delay the first gate control signal GCS1 output from the timing controller 250 and may transmit the delayed first gate control signal GCS1 to at least one of the scan drivers 210 and 213.

For example, the signal delay unit 240 may delay the first gate control signal GCS1 by a predetermined time constant while the second scan driver 213 operates. In on embodiment, the signal delay unit 240 may delay clock signals (signals for shifting a start pulse for controlling timing of a first scan signal).

In addition, the signal delay unit 240 may transmit the first gate control signal GCS1 output from the timing controller 250 while the first scan driver 210 operates. Thus, the difference in time constant between the scan signals, caused by the difference in load between the first scan lines S11 through S1*n* and the second scan lines S21 through S2*j*, may be reduced by the signal delay unit 240 controlling the first gate control signal GCS1 for driving the first scan driver 210 and the second scan driver 213.

The first emission control driver 220 supplies emission control signals to the first emission control lines E11 through E1*n* based on a second gate control signal GCS2 from the timing controller 250. For example, the first emission control driver 220 may sequentially supply the emission control signals to the first emission control lines E11 through E1*n*. The emission control signals control emission time of the first pixels PXL1. The emission control signals may have greater widths than the scan signals.

The second emission control driver 223 supplies emission control signals to the second emission control lines E21 through E2*j*. For example, the second emission control driver 223 may sequentially supply the emission control signals to the second emission control lines E21 through E2*j*. The emission control signals control emission time of the second pixels PXL2. The emission control signals may have greater widths than the scan signals.

On the other hand, the emission control signals may have gate-off voltages (for example, high voltages) to turn off transistors in the pixels PXL1 and PXL2 and the scan signals may have gate-on voltages (for example, low voltages) to turn on the transistors in the pixels PXL1 and PXL2.

The data driver 230 supplies data signals to the data lines D1 through Dm based on a data control signal DCS. The data signals supplied to the data lines D1 through Dm are supplied to pixels PXL1 and PXL2 selected by the scan signals.

The timing controller 250 supplies the gate control signals GCS1 and GCS2 generated based on timing signals supplied from an external source to the scan drivers 210 and 213 and the emission control drivers 220 and 223 through a first signal line SL1 and a second signal line SL2. The timing controller 250 supplies the data control signal DCS to the data driver 230 through a third signal line SL3. In addition, the timing controller 250 supplies a control signal LCS to a signal delay unit 340 through an operation control signal line SL10.

A start pulse and clock signals are in each of the gate control signals GCS1 and CGS2. The start pulse controls timing of a first scan signal or a first emission control signal. The clock signals are used to shift the start pulse.

A source start pulse and clock signals are in the data control signal DCS. The source start pulse controls a sampling start point of time of data. The clock signals are used to control a sampling operation.

Figure 5:
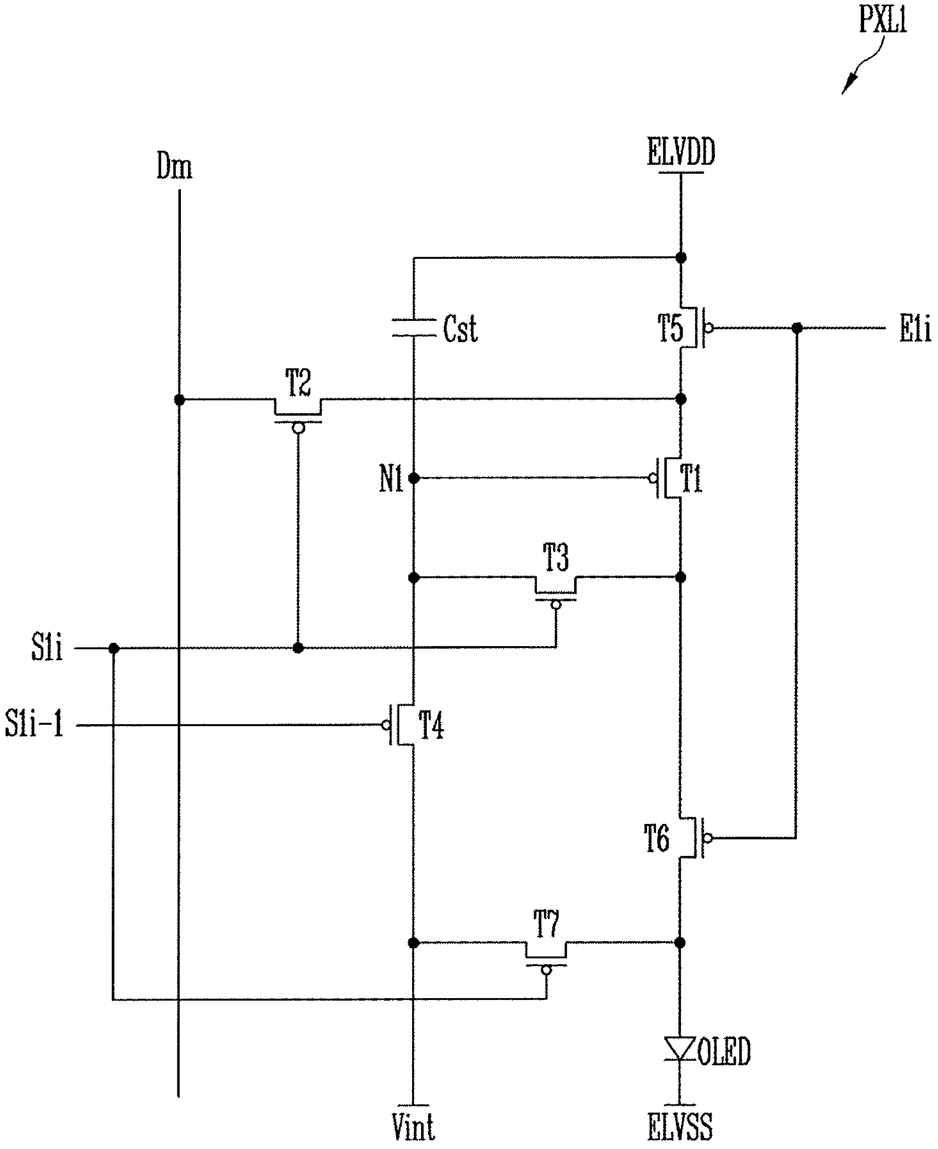
FIG. 5 illustrates an embodiment of a first pixel.

FIG. 5 illustrates an embodiment of the first pixel of FIG. 4. e.g., a pixel connected to the mth data line Dm and the ith first scan line S1*i* is illustrated.

Referring to FIG. 5, the first pixel PXL1 includes an OLED, first through seventh transistors T1 through T7, and a storage capacitor Cst. The OLED has an anode connected to the first transistor T1 via the sixth transistor T6 and a cathode electrode connected to the second power source ELVSS. The OLED emits light with a predetermined brightness corresponding to an amount of current supplied from the first transistor T1. The first power source ELVDD may have a higher voltage than the second power source ELVSS so that a current may flow to the OLED.

The seventh transistor T7 is connected between an initializing power source Vint and the anode electrode of the OLED. A gate electrode of the seventh transistor T7 is connected to the ith first scan line S1*i*. The seventh transistor T7 is turned on when a scan signal is supplied to the ith first scan line S1*i* and supplies a voltage of the initializing power source Vint to the anode electrode of the OLED. The initializing power source Vint may be set to have a lower voltage than a data signal.

The sixth transistor T6 is connected between the first transistor T1 and the OLED. A gate electrode of the sixth transistor T6 is connected to the ith first emission control line E1*i*. The sixth transistor T6 is turned off when an emission control signal is supplied to the ith first emission control line E1*i* and is turned on in the other case.

The fifth transistor T5 is connected between the first power source ELVDD and the first transistor T1. A gate electrode of the fifth transistor T5 is connected to the ith first emission control line E1*i*. The fifth transistor T5 is turned off when the emission control signal is supplied to the ith first emission control line E1*i* and is turned on in the other case.

The first transistor T1 (driving transistor) has a first electrode connected to the first power source ELVDD via the fifth transistor T5 and a second electrode connected to the anode electrode of the OLED via the sixth transistor T6. A gate electrode of the first transistor T1 is connected to a first node N1. The first transistor T1 controls an amount of current that flows from the first power source ELVDD to the second power source ELVSS via the OLED to correspond to a voltage of the first node N1.

The third transistor T3 is connected between the second electrode of the first transistor T1 and the first node N1. A gate electrode of the third transistor T3 is connected to the ith first scan line S1*i*. The third transistor T3 is turned on when the scan signal is supplied to the ith first scan line S1*i* and electrically connects the second electrode of the first transistor T1 and the first node N1. Therefore, when the third transistor T3 is turned on, the first transistor T1 is diode-connected.

The fourth transistor T4 is connected between the first node N1 and the initializing power source Vint. A gate electrode of the fourth transistor T4 is connected to an (i-1)th first scan line S1i-1. The fourth transistor T4 is turned on when the scan signal is supplied to the (i-1)th first scan line S1i-1 and supplies a voltage of the initializing power source Vint to the first node N1.

The second transistor T2 is connected between the mth data line Dm and the first electrode of the first transistor T1. A gate electrode of the second transistor T2 is connected to the ith first scan line S1*i*. The second transistor T2 is turned on when the scan signal is supplied to the ith first scan line S1*i* and electrically connects the mth data line Dm and the first electrode of the first transistor T1.

The storage capacitor Cst is connected between the first power source ELVDD and the first node N1. The storage capacitor Cst stores the data signal and a voltage corresponding to a threshold voltage of the first transistor T1. On the other hand, the second pixel PXL2 and a third pixel PXL3 may be implemented by the same circuit as the first pixel PXL1.

Figure 6:
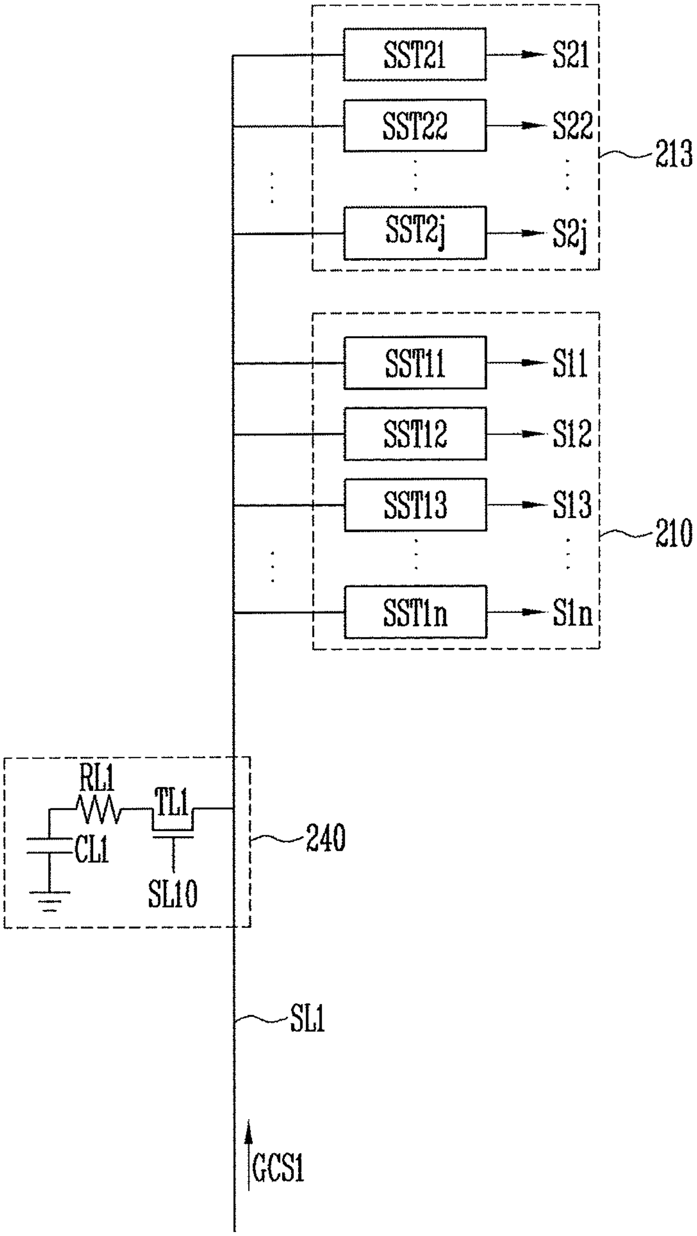
FIG. 6 illustrates an embodiment of scan stages and a signal delay unit.

FIG. 6 illustrates an embodiment of scan stages and a signal delay unit that are connected to a first signal line. Referring to FIG. 6, the first scan driver 210, the second scan driver 213, and the signal delay unit 240 may be connected to the first signal line SL1. The first signal line SL1 may supply the first gate control signal GCS1 to the first scan driver 210 and the second scan driver 213.

The first scan driver 210 may be connected to one end of each of the first scan lines S11 through S1*n* and may supply first scan signals to the first scan lines S11 through S1*n*. The first scan driver 210 may include a plurality of scan stages SST11 through SST1*n*. Each of the scan stages SST11 through SST1*n* of the first scan driver 210 is connected to the one end of each of the first scan lines S11 through S1*n* and the scan stages SST11 through SST1*n* may respectively supply the first scan signals to the first scan lines S11 through S1*n*. At this time, the scan stages SST11 through SST1*n* may operate based on the first gate control signal GCS1 supplied through the first signal line SL1. In addition, the scan stages SST11 through SST1*n* may be implemented by the same circuit.

The second scan driver 213 may be connected to one end of each of the second scan lines S21 through S2*j* and may supply second scan signals to the second scan lines S21 through S2*j*. The second scan driver 213 may include a plurality of scan stages SST21 through SST2*j*. Each of the scan stages SST21 through SST2*j* of the second scan driver 213 is connected to one end of each of the first scan lines S21 through S2*j* and the scan stages SST21 through SST2*j* may supply the second scan signals to the second scan lines S21 through S2*j*. At this time, the scan stages SST21 through SST2*j* may operate based on the first gate control signal GCS1 supplied through the first signal line SL1.

The scan stages SST21 through SST2*j* may be implemented by the same circuit.

In addition, the scan stages SST11 through SST1*n* of the first scan driver 210 and the scan stages SST21 through SST2*j* of the second scan driver 213 may be implemented by the same circuit.

The signal delay unit 240 may include signal delay elements (a first signal delay control capacitor CL1 and a first signal delay control resistor RL1) and a first signal delay control transistor TL1. The first signal delay control capacitor CL1 has a first electrode connected to a ground and a second electrode connected to the first signal delay control resistor RL1. The first signal delay control resistor RL1 has a first electrode connected to the second electrode of the first signal delay control capacitor CL1 and a second electrode connected to the first signal delay control transistor TL1.

The first signal delay control transistor TL1 has a first electrode connected to the second electrode of the first signal delay control resistor RL1 and a second electrode of the first signal delay control transistor TL1 may be connected to the first signal line SL1. A gate electrode of the first signal delay control transistor TL1 may be connected to the operation control signal line SL10 of the signal delay unit 240. The first signal delay control transistor TL1 may be turned on when the control signal LCS is supplied to the operation control signal line SL10 of the signal delay unit 240. In this case, the first gate control signal GCS1 may be delayed by a predetermined time constant T.

The time constant $\tau$ may be set based on a resistance value of the first signal delay control resistor RL1 and a capacitance value of the first signal delay control capacitor CL1.

The first signal delay control transistor TL1 is turned on while the scan stages SST21 through SST2*j* of the second scan driver 213 operate (that is, in a period in which the second scan signals are output) and may be turned off while the scan stages SST11 through SST1*n* of the first scan driver 210 operate (that is, in a period in which the first scan signals are output). Thus, the scan stages SST21 through SST2*j* of the second scan driver 213 may operate based on the first gate control signal GCS1 delayed by the time constant $\tau$. Therefore, the second scan signals output from the second scan lines S21 through S2*j* may be delayed based on the first gate control signal GCS1 delayed by the time constant $\tau$.

On the other hand, the capacitance value of the first signal delay control capacitor CL1 and the resistance value of the first signal delay control resistor RL1 may be set with reference to a difference in load between the first scan lines S11 through S1*n* and the second scan lines S21 through S2*j*. On the other hand, FIG. 6 illustrates that the first signal delay control capacitor CL1 the first signal delay control resistor RL1, and the first signal delay control transistor TL1 are sequentially connected. That is, the order in which the first signal delay control capacitor CL1, the first signal delay control resistor RL1. and the first signal delay control transistor TL1 are connected may vary.

In addition, FIG. 6 illustrates that both the first signal delay control capacitor CL1 and the first signal delay control resistor RL1 are provided as the signal delay elements. In another embodiment, only one of the first signal delay control capacitor CL1 and the first signal delay control resistor RL1 may be provided as the signal delay element.

Figure 7:
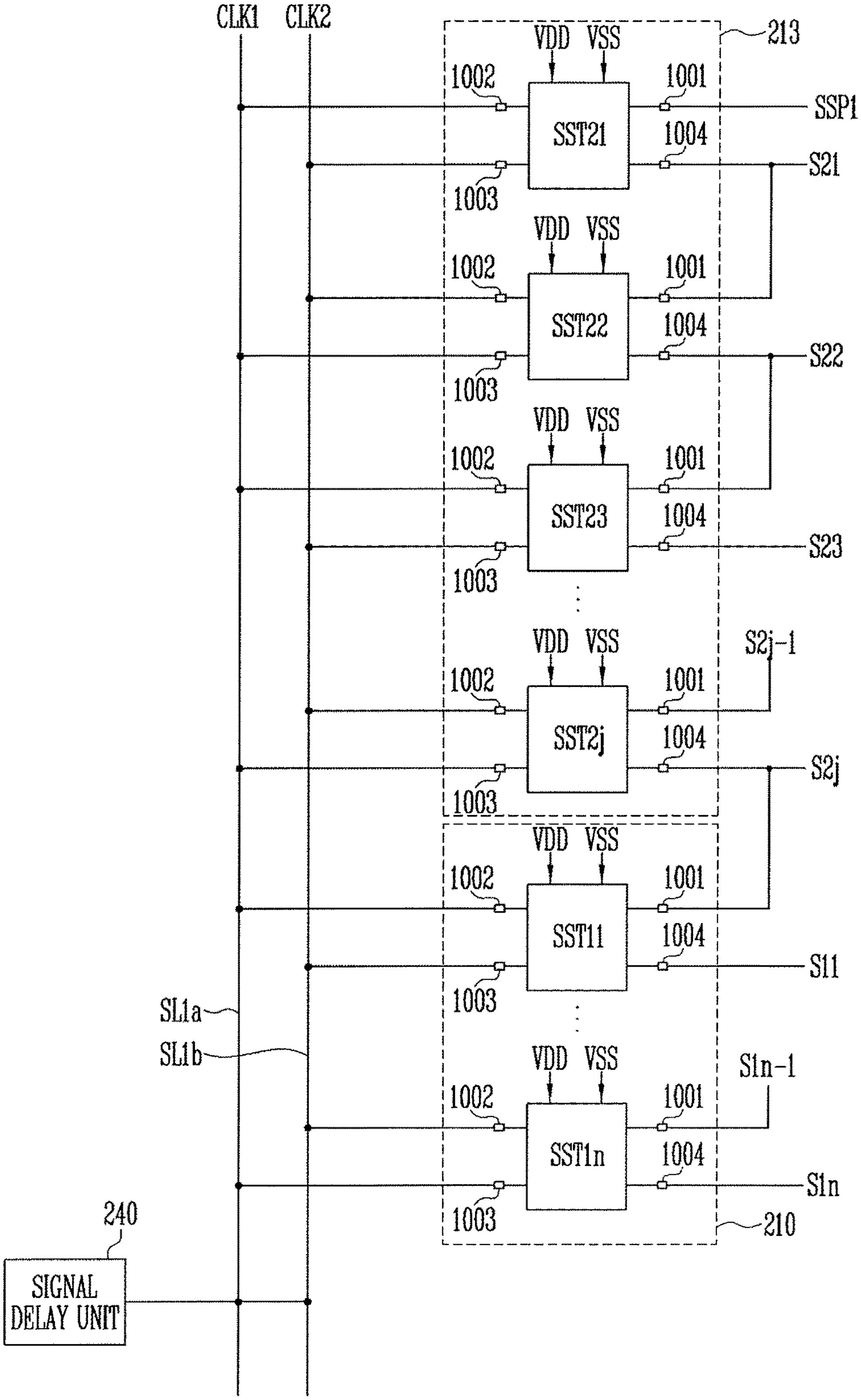
FIG. 7 illustrates an embodiment of a scan driver.

FIG. 7 illustrates an embodiment of a scan driver. A start pulse SSP1 and clock signals CLK1 and CLK2 may be in the first gate control signal GCS1 operated by the scan drivers 210 and 213. As illustrated in FIG. 7, when the first gate control signal GCS1 includes the plurality of clock signals CLK1 and CLK2, clock signal lines SL1*a* and SL1*b* that transmit the clock signals CLK1 and CLK2 may be connected to the signal delay unit 240.

Referring to FIG. 7, the second scan driver 213 may include the plurality of scan stages SST21 through SST2*j* and the first scan stage SST11 of the first scan driver 210 is provided after the last scan stage SST2*j* of the second scan driver 213. Each of the scan stages SST21 through SST2*j* and SST11 through SST1*n* is connected to one of the scan lines S21 through S2*j* and S11 through S1n and the scan stages SST21 through SST2*j* and SST11 through SST1*n* are driven based on the clock signals CLK1 and CLK2. The scan stages SST21 through SST2*j* and SST11 through SST1*n* may be implemented by the same circuit.

Each of the scan stages SST21 through SST2*j* and SST11 through SST1*n* includes first through third input terminals 1001 through 1003 and an output terminal 1004. The first input terminal 1001 of each of the scan stages SST21 through SST2*j* and SST11 through SST1*n* receives an output signal (that is, a scan signal) of a scan stage of a previous end or the start pulse SSP1. For example, the first input terminal 1001 of the first scan stage SST21 of the second scan driver 213 receives the start pulse SSP1 and the first input terminal 1001 of each of the remaining scan stages SST22 through SST2*j* and SST11 through SST1*n* receives an output signal of a scan stage of a previous end.

A second input terminal 1002 of an lth (l is an odd number or an even number) scan stage receives the first clock signal CLK1 and the third input terminal 1003 of the lth scan stage receives the second clock signal CLK2. A second input terminal 1002 of an (l+l)th scan stage receives the second clock signal CLK2 and the third input terminal 1003 of the (l+l)th scan stage receives the first clock signal CLK1.

The first clock signal CLK1 and the second clock signal CLK2 have the same period and phases of the first clock signal CLK1 and the second clock signal CLK2 do not overlap. For example, when a period in which a scan signal is supplied to one scan line is referred to as a 1 horizontal period 1H, the clock signals CLK1 and CLK2 have periods of 2H and are supplied in different horizontal periods.

In addition, each of the scan stages SST21 through SST2*j* and SST11 through SST1*n* receives a first power source VDD and a second power source VSS. The first power source VDD may have a gate-off voltage, for example, a high voltage. The second power source VSS may have a gate-on voltage, for example, a low voltage.

In a first period in which the scan signals are supplied to the second scan lines S21 through S2*j*, the first signal delay control transistor TL1 of the signal delay unit 240 may be turned on so that the clock signals CLK1 and CLK2 delayed by the time constant τ may be applied to the scan stages SST21 through SST2*j* of the second scan driver 213.

In a second period in which the scan signals are supplied to the first scan lines S11 through S1*n*, the first signal delay control transistor TL1 of the signal delay unit 240 may be turned off so that the clock signals CLK1 and CLK2 output by the timing controller 250 may be applied to the scan stages SST11 through SST1*n* of the first scan driver 210.

Figure 8:
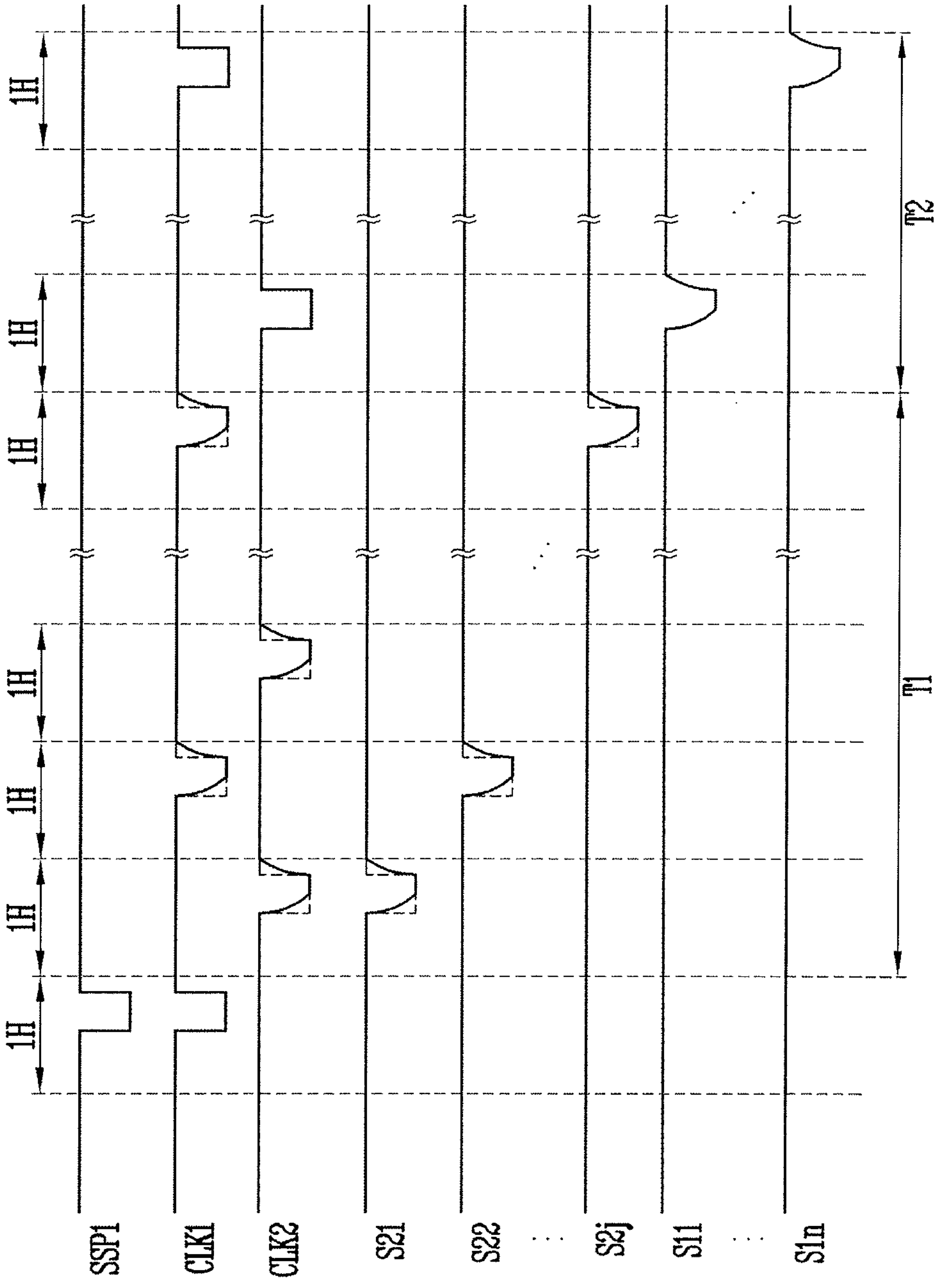
FIG. 8 illustrates an embodiment of a first gate control signal input to the scan stage and scan signals output from the scan stage of FIG. 7.

FIG. 8 illustrates an embodiment of a waveform diagram for a first gate control signal input to the scan stage of FIG. 7 and scan signals output from the scan stage of FIG. 7. Referring to FIG. 8, the first clock signal CLK1 and the second clock signal CLK2 have periods of a 2 horizontal period (2H) and are supplied in different horizontal periods. The second clock signal CLK2 may be shifted from the first clock signal CLK1 by a half period (that is, the 1 horizontal period).

The start pulse SSP1 supplied to the first input terminal 1001 is supplied in synchronization with the clock signal supplied to the second input terminal 1002, that is, the first clock signal CLK1.

As illustrated in FIG. 8, a horizontal period in which the scan signals are supplied to the second scan lines S21 through S2*j* may be a first period T1 and a horizontal period in which the scan signals are output to the first scan lines S11 through S1*n* may be a second period T2.

In the first period T1, the first signal delay control transistor TL1 of the signal delay unit 240 may be turned on so that the clock signals CLK1 and CLK2 delayed by the time constant τ may be applied to the scan stages SST21 through SST2*j*. For example, in the first period T1, falling edges and rising edges of the clock signals CLK1 and CLK2 may be inclined.

In waveforms illustrating the clock signals of FIG. 8, dotted lines illustrate clock signals generated by the timing controller 250 and solid lines illustrate clock signals input to the scan stages SST11 through SST1*n* and SST21 through SST2*j*. Thus, in FIG. 8, the clock signals CLK1 and CLK2 are delayed in the first period T1.

Shapes of the second scan signals output from the second scan lines S21 through S2*j* may correspond to the clock signals CLK1 and CLK2. Therefore, in the first period T1, falling edges and rising edges of the second scan signals output from the second scan lines may be inclined. In waveforms illustrating the second scan signals of FIG. 8, dotted lines illustrate scan signals generated by the clock signals that are not delayed and solid lines illustrate scan signals generated by the delayed clock signals.

In the second period T2, the first signal delay control transistor TL1 may be turned off, so that the clock signals CLK1 and CLK2 output by the timing controller 250 may be applied to the scan stages SST11 through SST1*n* of the first scan driver 210. Thus, in the second period, T2, the falling edges and the rising edges of the clock signals CLK1 and CLK2 may be parallel.

Since the length of the first scan lines S11 through S1*n* is greater than the length of the second scan lines S21 through S2*j*, the loads of the first scan lines S11 through S1*n* may be greater than the loads of the second scan lines S21 through S2*j*. For example, although the clock signals CLK1 and CLK2 output by the timing controller 250 are applied to the scan stages SST11 through SST1*n* as they are, as illustrated in FIG. 8, the first scan signals are delayed.

According to the present invention, the second scan signals are also delayed by the signal delay unit 240 as much the first scan signals are delayed by the loads of the first scan lines S11 through S1*n*. Thus, the brightness difference between the first pixel region AA1 and the second pixel region AA2 may be reduced.

Figure 9:
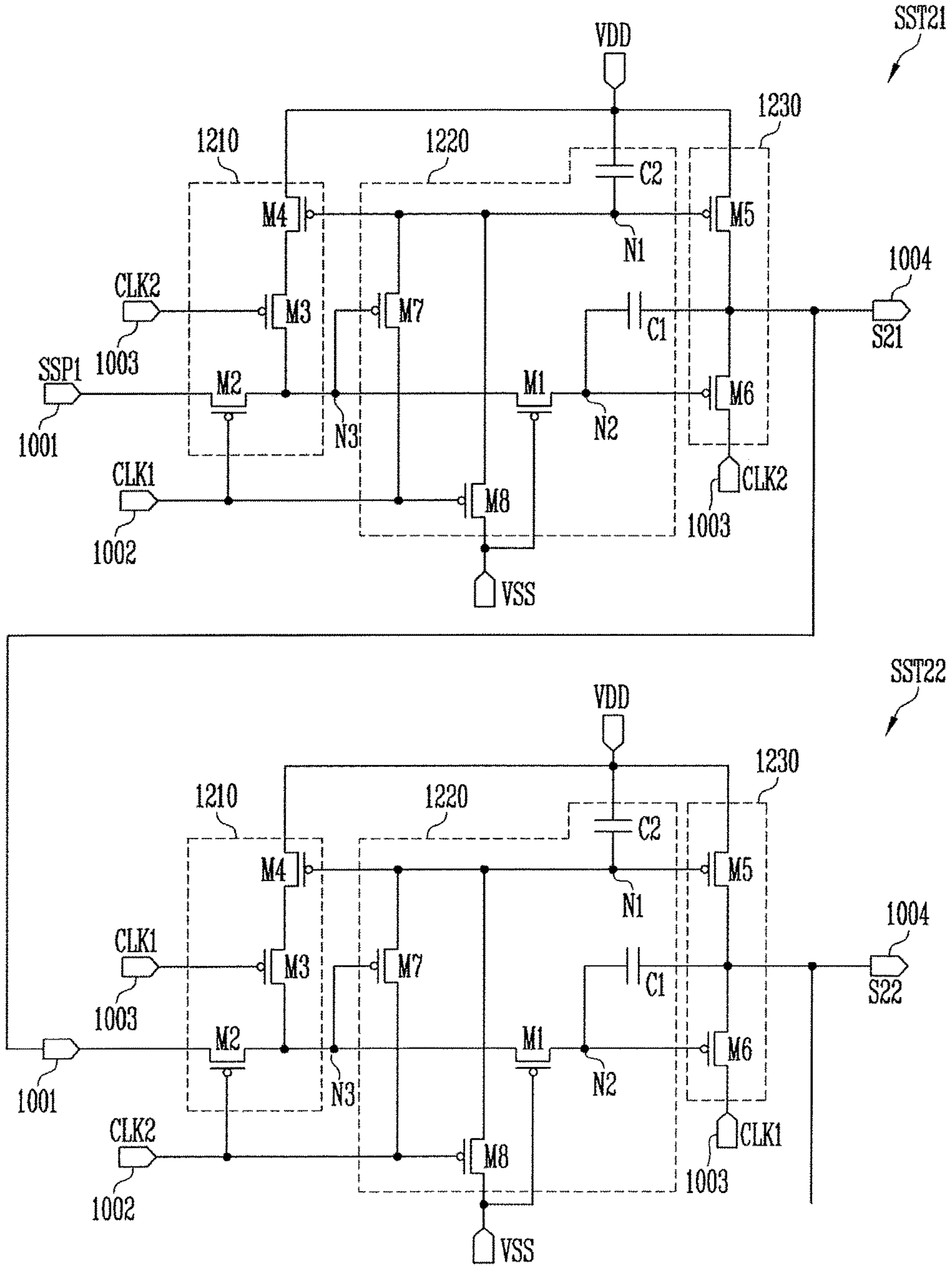
FIG. 9 illustrates an embodiment of the scan stage of FIG. 7.

FIG. 9 is a circuit diagram illustrating an embodiment of the scan stage of FIG.

7. In FIG. 9, for convenience sake, the first scan stage SST21 and the second scan stage SST22 of the second scan driver are illustrated.

Referring to FIG. 9, the first scan stage SST21 includes a first driver 1210, a second driver 1220, an output unit (or a buffer) 1230, and a first transistor M1. The output unit 1230 controls a voltage supplied to an output terminal 1004 to correspond to voltages of the first node N1 and a second node N2. For this purpose, the output unit 1230 includes a fifth transistor M5 and a sixth transistor M6.

The fifth transistor M5 is between the first power source VDD and the output terminal 1004 and a gate electrode thereof is connected to the first node N1. The fifth transistor M5 controls connection between the first power source VDD and the output terminal 1004 based on the voltage applied to the first node N1.

The sixth transistor M6 is between the output terminal 1004 and the third input terminal 1003 and a gate electrode thereof is connected to the second node N2. The sixth transistor M6 controls connection between the output terminal 1004 and the third input terminal 1003 based on the voltage applied to the second node N2.

The output unit 1230 is driven as the buffer. In addition, the fifth transistor and/or the sixth transistor M6 may be configured by connecting a plurality of transistors in parallel.

The first driver 1210 controls a voltage of a third node N3 based on signals supplied to the first through third input terminals 1001 through 1003. For this purpose, the first driver 1210 includes second through fourth transistors M2 through M4.

The second transistor M2 is between the first input terminal 1001 and the third node n3 and a gate electrode thereof is connected to the second input terminal 1002. The second transistor M2 controls connection between the first input terminal 1001 and the third node N3 based on a signal supplied to the second input terminal 1002.

The third transistor M3 and the fourth transistor M4 are serially connected between the third node N3 and the first power source VDD. Actually, the third transistor M3 is between the fourth transistor m4 and the third node N3 and a gate electrode thereof is connected to the third input terminal 1003. The third transistor M3 controls connection between the fourth transistor M4 and the third node N3 based on a signal supplied to the third input terminal 1003.

The fourth transistor M4 is positioned between the third transistor M3 and the first power source VDD and a gate electrode thereof is connected to the first node N1. The fourth transistor M4 controls connection between the third transistor M3 and the first power source VDD based on the voltage of the first node N1.

The second driver 1220 controls the voltage of the first node N1 to correspond to a voltage of the second input terminal 1002 and a voltage of the third node N3. For this purpose, the second driver 1220 includes a seventh transistor M7, an eighth transistor M8, a first capacitor C1, and a second capacitor C2.

The first capacitor C1 is connected between the second node N2 and the output terminal 1004. The first capacitor C1 charges a voltage corresponding to turn-on or turn-off of the sixth transistor M6. The second capacitor C2 is connected between the first node N1 and the first power source VDD. The second capacitor C2 charges the voltage applied to the first node N1.

The seventh transistor M7 is between the first node N1 and the second input terminal 1002 and a gate electrode thereof is connected to the third node N3. The seventh transistor M7 controls connection between the first node N1 and the second input terminal 1002 based on the voltage of the third node N3.

The eighth transistor M8 is between the first node N1 and the second power source Vss and a gate electrode thereof is connected to the second input terminal 1002. The eighth transistor M8 controls connection between the first node N1 and the second power source VSS based on the signal of the second input terminal 1002.

The first transistor M1 is between the third node N3 and the second node N2 and a gate electrode thereof is connected to the second power source VSS. The first transistor M1 maintains electrical connection of the third node N3 and the second node N2 while maintaining a turn-on state.

In addition, the first transistor M1 limits a voltage drop width of the third node N3 to correspond to the voltage of the second node N2. For example, although the voltage of the second node N2 is reduced to a voltage lower than a voltage of the second power source VSS, the voltage of the third node N3 does not become lower than a voltage obtained by subtracting the threshold voltage of the first transistor M1 from the voltage of the second power source VSS, which will be described in detail later.

Figure 10:
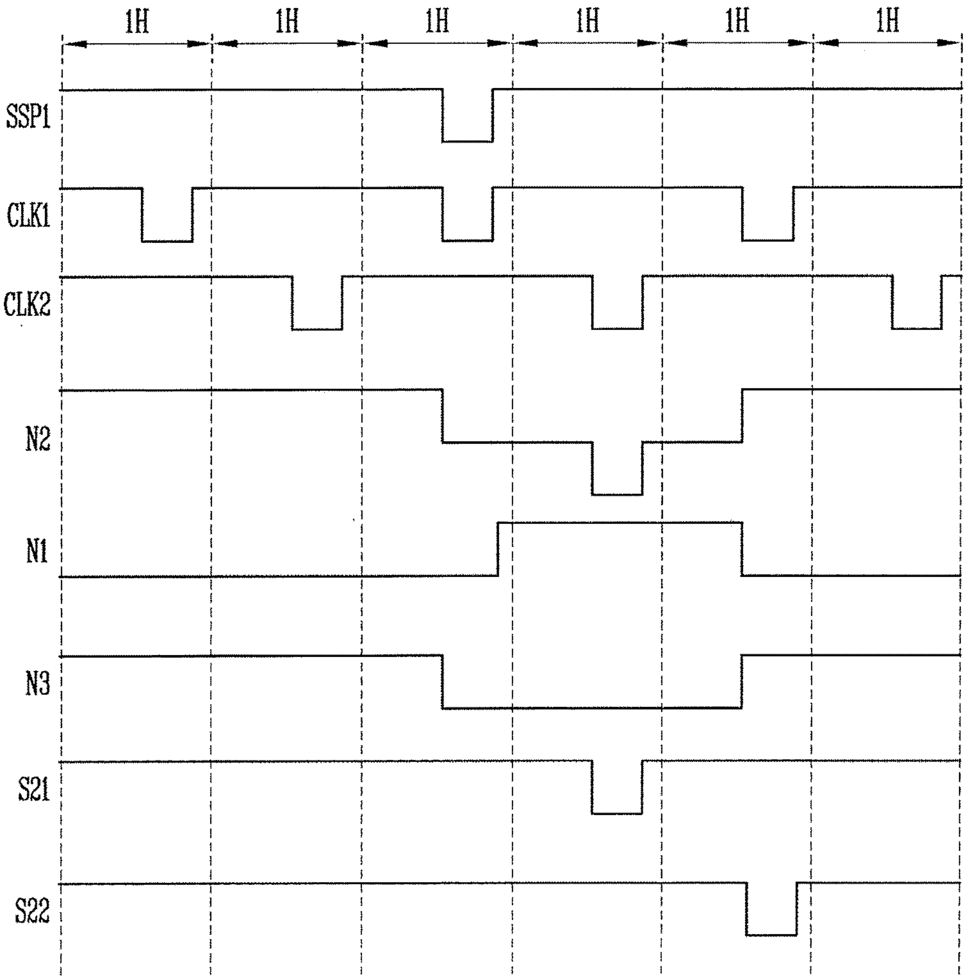
FIG. 10 illustrates an embodiment of waveforms corresponding to a method for driving the scan stage of FIG. 9.

FIG. 10 illustrates an embodiment of a method for driving the scan stage of FIG. 9. In FIG. 10. for convenience sake, operation processes will be described by using the first scan stage SST21. In addition, since FIG. 10 is for describing the method of driving the scan stage, it is estimated that the above-described delay phenomenon is excluded from the clock signals input to the scan stage and the scan signal output from the scan stage.

Referring to FIG. 10, the first clock signal CLK1 and the second clock signal CLK2 have periods of a 2 horizontal period (2H) and are supplied in different horizontal periods. For example, the second clock signal CLK2 is shifted from the first clock signal CLK1 by a half period (that is, the 1 horizontal period).

The start pulse SSP1 supplied to the first input terminal 1001 is supplied in synchronization with the clock signal supplied to the second input terminal 1002, that is, the first clock signal CLK1. When the start pulse SSP1 is supplied, the first input terminal 1001 is set as the voltage of the second power source VSS. When the start pulse SSP1 is not supplied, the first input terminal 1001 may be set as a voltage of the first power source VDD.

When the clock signals CLK1 and CLK2 are supplied to the second input terminal 1002 and the third input terminal 1003, the second input terminal 1002 and the third input terminal 1003 are set to have the voltage of the second power source VSS. When the clock signals CLK1 and CLK2 are not supplied to the second input terminal 1002 and the third input terminal 1003, the second input terminal 1002 and the third input terminal 1003 are set to have the voltage of the first power source VDD.

Operation processes will be described in detail as follows. First, the start pulse SSP1 is supplied in synchronization with the first clock signal CLK1. When the first clock signal CLK1 is supplied, the second transistor M2 and the eighth transistor M8 are turned on. When the second transistor M2 is turned on, the first input terminal 1001 and the third node N3 are electrically connected. Since the first transistor M1 is always set to be in a turn-on state, the second node N2 maintains electrical connection to the third node N3.

When the first input terminal 1001 and the third node N3 are electrically connected, the third node N3 and the second node N2 are set to have low voltages by the start pulse SSP1 supplied to the first input terminal 1001. When the third node N3 and the second node N2 are set to have the low voltages, the sixth transistor M6 and the seventh transistor M7 are turned on.

When the sixth transistor M6 is turned on, the third input terminal 1003 and the output terminal 1004 are electrically connected. The third terminal 1003 is set to have a high voltage (that is, the second clock signal CLK2 is not supplied) so that a high voltage is output to the output terminal 1004. When the seventh transistor M7 is turned on, the second input terminal 1002 and the first node N1 are electrically connected. Then, a voltage of the first clock signal CLK1 supplied to the second input terminal 1002, that is, a low voltage is supplied to the first node N1.

In addition, when the first clock signal CLK1 is supplied, the eighth transistor M8 is turned on. When the eighth transistor M8 is turned on, the voltage of the second power source VSS is supplied to the first node N1. The voltage of the second power source VSS is set to be the same as (similar to) the first clock signal CLK1 so that the first node N1 stably maintains the low voltage.

When the first node N1 is set to have the low voltage, the fourth transistor M4 and the fifth transistor M5 are turned on. When the fourth transistor M4 is turned on, the first power source VDD and the third transistor m3 are electrically connected. Since the third transistor M3 is set to be in a turn-off state, although the fourth transistor M4 is turned on, the third node N3 stably maintains a low voltage. When the fifth transistor M5 is turned on, the voltage of the first power source VDD is supplied to the output terminal 1004. The voltage of the first power source VDD is set as the same voltage as the high voltage supplied to the third input terminal 1003, so that the output terminal 1004 stably maintains the high voltage.

Then, supplies of the start signal SSP1 and the first clock signal CLK1 are stopped. When the supply of the first clock signal CLK1 is stopped, the second transistor M2 and the eighth transistor M8 are turned off. At this time, the sixth transistor M6 and the seventh transistor M7 maintain turn-on states based on the voltage stored in the first capacitor C1. Thus, the second node N2 and the third node N3 maintain the low voltages due to the voltage stored in the first capacitor C1.

When the sixth transistor M6 maintains the turn-on state, the output terminal 1004 and the third input terminal 1003 maintain electrical connection. When the seventh transistor M7 maintains the turn-on state, the first node Ni maintains electrical connection to the second input terminal 1002. The second input terminal 1002 is set to have a high voltage as supply of the first clock signal CLK1 is stopped so that the first node N1 is set to have a high voltage. When the high voltage is supplied to the first node N1. the fourth transistor M4 and the fifth transistor M5 are turned off.

Then, the second clock signal CLK2 is supplied to the third input terminal 1003.

At this time, since the sixth transistor M6 is set to be in the turn-on state, the second clock signal CLK2 supplied to the third input terminal 1003 is supplied to the output terminal 1004. In this case, the output terminal 1004 outputs the second clock signal CLK2 to the second scan lines S21 through S2*j* as a scan signal.

When the second clock signal CLK2 is supplied to the output terminal 1004, the voltage of the second node N2 is reduced to the voltage lower than the voltage of the second power source VSS, by coupling of the first capacitor C1 so that the sixth transistor M6 stably maintains the turn-on state. On the other hand, although the voltage of the second node N2 is reduced, the third node N3 maintains the voltage of the second power source VSS (the voltage obtained by subtracting the threshold voltage of the first transistor M1 from the voltage of the second power source VSS).

After a scan signal is output to the first scan line S11, the supply of the second clock signal CLK2 is stopped. When the supply of the second clock signal CLK2 is stopped, the output terminal 1004 outputs a high voltage. The voltage of the second node N2 is increased to the voltage of the second power source VSS to correspond to the high voltage of the output terminal 1004.

Then, the first clock signal CLK1 is supplied. When the first clock signal CLK1 is supplied, the second transistor M2 and the eighth transistor M8 are turned on. When the second transistor M2 is turned on, the first input terminal 1001 and the third node N3 are electrically connected. At this time, the start pulse SSPI is not supplied to the first input terminal 1001, so that the first input terminal 1001 is set to have a high voltage. Therefore, when the first transistor M1 is turned on, the high voltage is supplied to the third node N3 and the second node N2, so that the sixth transistor M6 and the seventh transistor M7 are turned off.

When the eighth transistor M8 is turned on, the second power source VSS is supplied to the first node N1 so that the fourth transistor M4 and the fifth transistor M5 are turned on. When the fifth transistor M5 is turned on, the voltage of the first power source VDD is supplied to the output terminal 1004. Then, the fourth transistor M4 and the fifth transistor M5 maintain turn-on states based on the voltage charged in the second capacitor C2, so that the output terminal 1004 stably receives the voltage of the first power source VDD.

In addition, when the second clock signal CLK2 is supplied, the third transistor M3 is turned on. At this time, since the fourth transistor M4 is set to be in the turn-on state, the voltage of the first power source VDD is supplied to the third node N3 and the second node N2. In this case, the sixth transistor M6 and the seventh transistor M7 stably maintain turn-off states.

The second scan stage SST22 receives an output signal (that is, a scan signal) of the first scan stage SST21 in synchronization with the second clock signal CLK2. In this case, the second scan stage SST22 outputs a scan signal to the second scan line S22 in synchronization with the first clock signal CLK1. The scan stages according to the present embodiment sequentially output the scan signals to the scan lines while repeating the above-described processes.

According to the present embodiment, the first transistor M1 limits a voltage minimum width of the third node N3 regardless of the voltage of the second node N2, so that manufacturing expenses may be reduced and driving reliability may be secured. For example, when a scan signal is supplied to the output terminal 1004, the voltage of the second node N2 is reduced to a voltage of about VSS-(VDD-VSS). When it is assumed that the voltage of the first power source VDD is 7V and the voltage of the second power source VSS is −8V, the voltage of the second node N2 is reduced to about −20V in consideration of threshold voltages of the transistors.

When the first transistor M1 is removed, Vds of the second transistor m2 and Vgs of the seventh transistor M7 are set as about −27V. Therefore, highly pressure-resistant parts must be used as the second transistor M2 and the seventh transistor M7. In addition, when a high voltage is applied to the second transistor M2 and the seventh transistor M7, a large amount of power is consumed and the driving reliability deteriorates. However, according to the present embodiment, when the first transistor M1 is added between the third node N3 and the second node N2, the voltage of the third node N3 maintains the voltage of the second power source VSS so that Vds of the second transistor M2 and Vgs of the seventh transistor M7 are set as about −14V.

Figure 11:
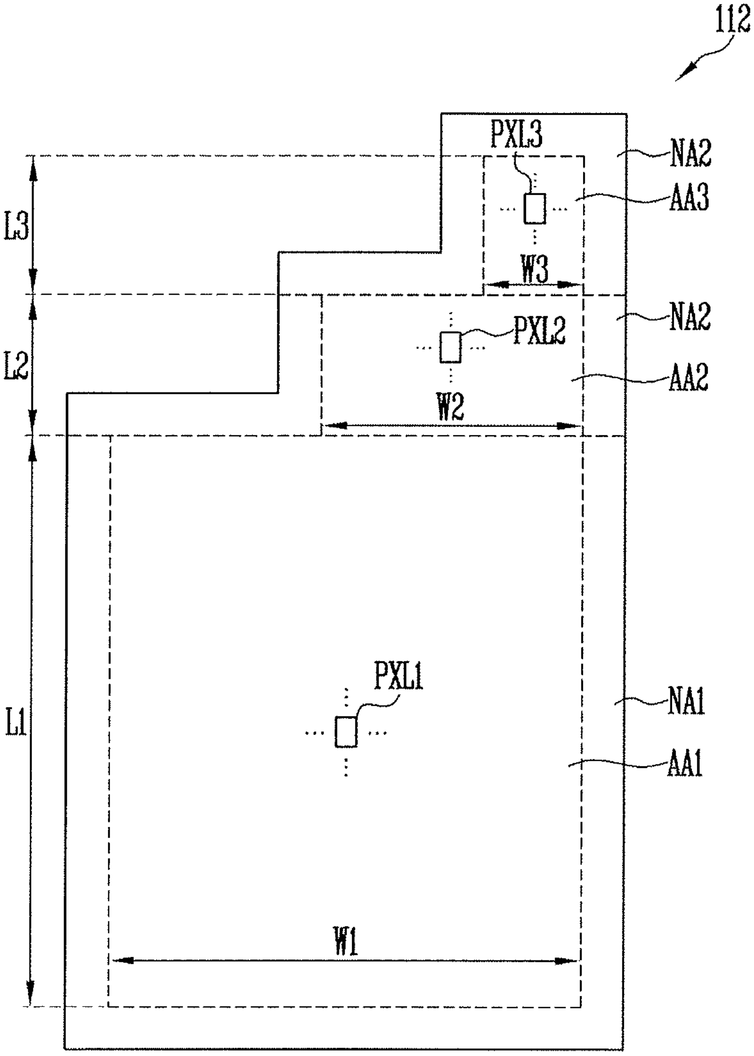
FIG. 11 illustrates another embodiment of a substrate.

FIG. 11 illustrates another embodiment of a substrate 112 which may include pixel regions and peripheral regions. The pixel regions AA1, AA2, and AA3 may include a first pixel region AA1, a second pixel region AA2, and a third pixel region AA3. The second pixel region AA2 may be at one side of the first pixel region AA1. For example, the second pixel region AA2 may be a protrusion that extends from a part of an upper side of the first pixel region AA1. The third pixel region AA3 may be at one side of the second pixel region AA2. For example, the third pixel region AA3 may be a protrusion that extends from a part of an upper side of the second pixel region AA2.

The first pixel region AA1 may have a greater area than the second pixel region AA2 and the third pixel region AA3. For example, the width W1 of the first pixel region AA1 may be greater than the width W2 of the second pixel region AA2 and the width W3 of the third pixel region AA3. The length L1 of the first pixel region AA1 may be greater than the length L2 of second pixel region AA2 and the length L3 of third pixel region AA3.

The second pixel region AA2 may have a greater area than the third pixel region AA3. The width W2 of the second pixel region AA2 may be greater than the width W3 of the third pixel region AA3. In addition, the length L2 of the second pixel region AA2 may be the same as or greater than the length L3 of the third pixel region AA3.

The peripheral regions NA1, NA2, and NA3 may include a first peripheral region NA1, a second peripheral region NA2, and a third peripheral region NA3. The first peripheral region NA1 exists around the first pixel region AA1 and may surround at least a part of the first pixel region AA1. The second peripheral region NA2 exists around the second pixel region AA2 and may surround the part of the first pixel region AA1 and at least a part of the second pixel region AA2. The third peripheral region NA3 exists around the third pixel region AA3 and may surround the part of the second pixel region AA2 and a part of the third pixel region AA3.

The pixels PXL1, PXL2, and PXL3 may include first pixels PXL1, second pixels PXL2, and third pixels PXL3. For example, the first pixels PXL1 may be in the first pixel region AA1, the second pixels PXL2 may be in the second pixel region AA2, and the third pixels PXL3 may be in the third pixel region AA3.

In the first pixel region AA1, the same number of first pixels PXL1 may be in each horizontal line. In addition, in the second pixel region AA2, the same number of second pixels PXL2 may be in each horizontal line. In the third pixel region AA3, the same number of third pixels PXL3 may be in each horizontal line.

As described above, since the width W1 of the first pixel region AA1 is greater than the width W2 of the second pixel region AA2 and the width W2 of the second pixel region AA2 is greater than the width W3 of the third pixel region AA3, the number of first pixels PXL1 in the horizontal lines of the first pixel region AA1 may be greater than the number of second pixels PXL2 in the horizontal lines of second pixel region AA2. In addition, the number of second pixels PXL2 in the horizontal lines of the second pixel region AA2 may be greater than the number of third pixels PXL3 in the horizontal lines of the third pixel region AA3. The substrate 112 may have various shapes so that the above-described pixel regions AA1, AA2, and AA3 and peripheral regions NA1, NA2, and NA3 may be set.

Figure 12:
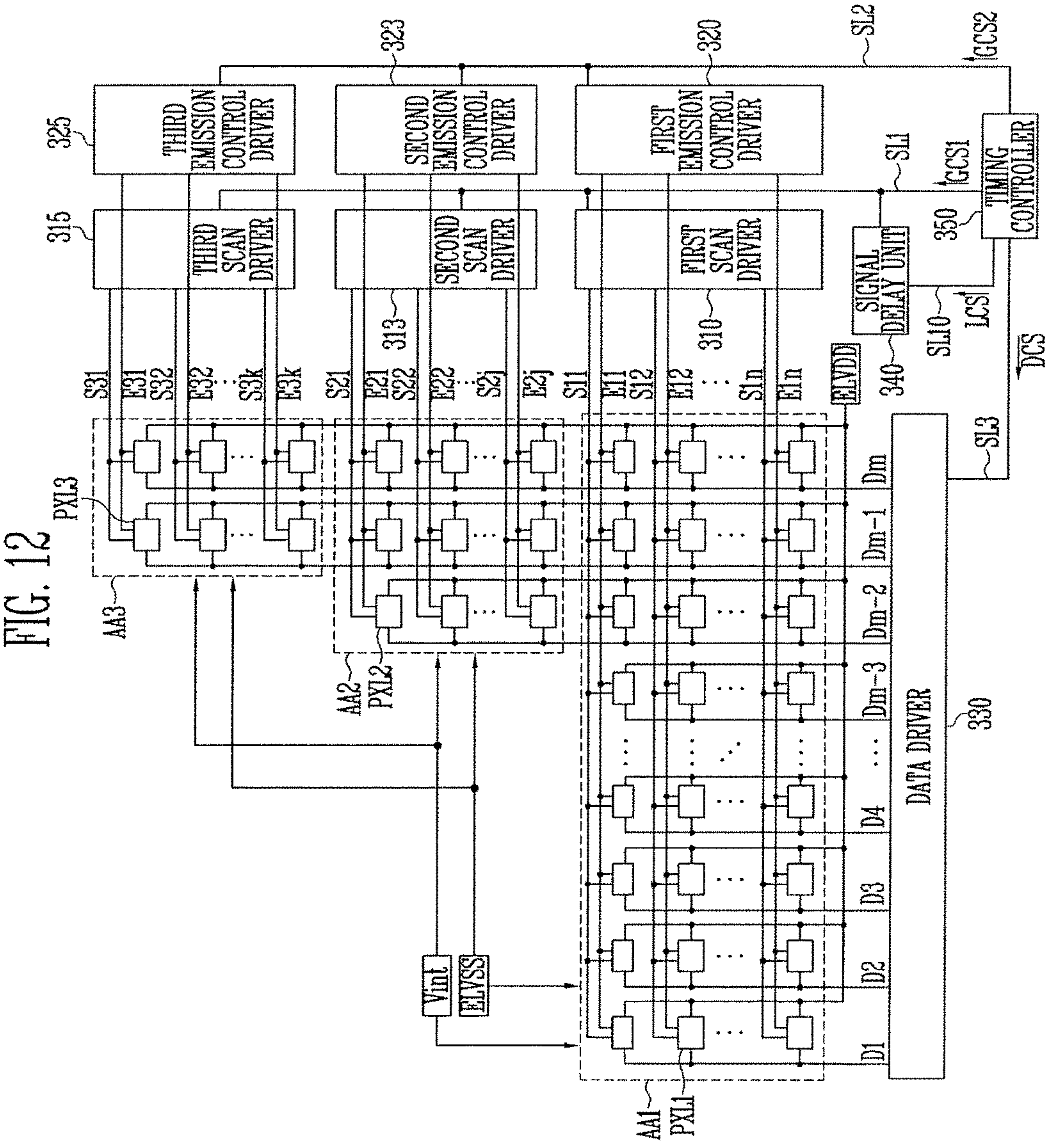
FIG. 12 illustrates another embodiment of a display device.

FIG. 12 illustrates another embodiment of a display device which may include the first pixels PXL1, the second pixels PXL2, the third pixels PXL3, a first scan driver 310, a first emission control driver 320, a second scan driver 313, a second emission control driver 323, a third scan driver 315, a third emission control driver 325, a data driver 330, a signal delay unit 340, and a timing controller 350.

The first pixels PXL1 are in the first pixel region AA1 divided by the first scan lines S11 through S1*n*, the first emission control lines E11 through E1*n*, and the data lines D1 through Dm. The first pixels PXL1 receive the data signals from the data lines D1 through Dm when the scan signals are supplied from the first scan lines S11 through S1*n*. The first pixels PXL1 that receive the data signals control the amount of current that flows from the first power source ELVDD to the second power source ELVSS via the OLEDs.

The second pixels PXL2 are in the second pixel region AA2 divided by the second scan lines S21 through S2*j*, the second emission control lines E21 through E2*j*, and the data lines Dm-2 through Dm. The second pixels PXL2 receive the data signals from the data lines Dm-2 through Dm when the scan signals are supplied from the second scan lines S21 through S2*j*. The second pixels PXL2 that receive the data signals control the amount of current that flows from the first power source ELVDD to the second power source ELVSS via the OLEDs.

The third pixels PXL3 are in the third pixel region AA3 divided by third scan lines S31 through S3*k*, second emission control lines E31 through E3*k*, and data lines Dm-1 through Dm. The third pixels PXL3 receive the data signals from the data lines Din-1 through Dm when scan signals are supplied from the third scan lines S31 through S3*k*. The third pixels PXL3 that receive the data signals control the amount of current that flows from the first power source ELVDD to the second power source ELVSS via OLEDs.

The first scan driver 310 supplies the scan signals to the first scan lines S11 through S1*n* based on the first gate control signal GCS1 from the timing controller 350. For example, the first scan driver 310 may sequentially supply the scan signals to the first scan lines S11 through S1*n*. When the scan signals are sequentially supplied to the first scan lines S11 through S1*n*, the first pixels PXL1 are sequentially selected in units of horizontal lines.

The second scan driver 313 supplies the scan signals to the second scan lines S21 through S2*j* based on the first gate control signal GCS1 from the timing controller 350. For example, the second scan driver 313 may sequentially supply the scan signals to the second scan lines S21 through S2*j*. When the scan signals are sequentially supplied to the second scan lines S21 through S2*j*, the second pixels PXL2 are sequentially selected in units of horizontal lines.

The third scan driver 315 supplies the scan signals to the third scan lines S31 through S3*k* based on the first gate control signal GCS1 from the timing controller 350. For example, the third scan driver 315 may sequentially supply the scan signals to the third scan lines S31 through S3*k*. When the scan signals are sequentially supplied to the third scan lines S31 through S3*k*, the third pixels PXL3 are sequentially selected in units of horizontal lines.

On the other hand, the loads of the first scan lines S11 through S1*n*, the loads of the second scan lines S21 through S2*j*, and loads of the third scan lines S31 through S3*k* may be different from one another.

Since the width W1 of the first pixel region AA1 is greater than the width W2 of the second pixel region AA2, the length of the first scan lines S11 through S1*n* may be greater than the length of the second scan lines S21 through S2*j*. Thus, the number of second pixels PXL2 connected to one of the second scan lines S21 through S2*j* may be less than the number of first pixels PXL1 connected to one of the first scan lines S11 through S1*n*. Therefore, the loads of the first scan lines S11 through S1*n* may be greater than the loads of the second scan lines S21 through S2*j*.

Since the width W2 of the second pixel region AA2 is greater than a width W3 of the third pixel region AA3, the length of the second scan lines S21 through S2*j* may be greater than a length of the third scan lines S31 through S3*k*. Thus, the number of third pixels PXL3 connected to one of the third scan lines S31 through S3*k* may be less than the number of second pixels PXL2 connected to one of the second scan lines S21 through S2*j*. Therefore, the loads of the second scan lines S21 through S2*j* may be greater than the loads of the third scan lines S31 through S3*k*.

As a result, differences in time constant may be generated among the scan signals supplied to the pixels PXL1, PXL2, and PXL3. For example, the scan signals supplied to the first scan lines S11 through S1*n* have greater delay than the scan signals supplied to the second scan lines S21 through S2*j*. In addition, the scan signals supplied to the second scan lines S21 through S2*j* have greater delay than the scan signals supplied to the third scan lines S31 through S3*k*. Brightness differences may be generated among the first pixels PXL1 through the third pixels PXL3 due to the differences in time constant among the scan signals.

The signal delay unit 340 according to the present embodiment may delay the first gate control signal GCS1 output from the timing controller 350 by a predetermined time constant and may transmit the delayed first gate control signal GCS1 to at least one of the scan drivers 310, 313, and 315. For example, the signal delay unit 340 may delay the first gate control signal GCS1 while the second scan driver 313 or the third scan driver 315 operates. In this case, the first gate control signal GCS1 may be delayed more in a period in which the third scan driver 315 operates than in a period in which the second scan driver 313 operates. In addition, the signal delay unit 340 may transmit the first gate control signal GCS1 output from the timing controller 350 as is while the first scan driver 310 operates. Thus, the first gate control signal GCS1 may not be delayed.

The first emission control driver 320 supplies the emission control signals to the first emission control lines E11 through E1*n* based on the second gate control signal GCS2 from the timing controller 350. For example, the first emission control driver 320 may sequentially supply the emission control signals to the first emission control lines E11 through E1*n*. The emission control signals are used to control the emission time of the first pixels PXL1. For this purpose, the emission control signals may have greater widths than the scan signals.

The second emission control driver 323 supplies the emission control signals to the second emission control lines E21 through E2*j*. For example, the second emission control driver 323 may sequentially supply the emission control signals to the second emission control lines E21 through E2*j*. The emission control signals are used to control the emission time of the second pixels PXL2. For this purpose, the emission control signals may be set to have larger widths than the scan signals.

The third emission control driver 325 supplies the emission control signals to the third emission control lines E31 through E3*k*. For example, the third emission control driver 325 may sequentially supply the emission control signals to the third emission control lines E31 through E3*k*. The emission control signals are used to control the emission time of the third pixels PXL3. For this purpose, the emission control signals may be set to have larger widths than the scan signals.

The emission control signals are set to have gate-off voltages (for example, high voltages) to turn off transistors in the pixels PXL1, PXL2, and PXL3. The scan signals may have gate-on voltages (for example, low voltages) to turn on the transistors in the pixels PXL1, PXL2, and PXL3.

The data driver 330 supplies the data signals to the data lines D1 through Dm based on the data control signal DCS. The data signals supplied to the data lines D1 through Dm are supplied to the pixels PXL1 and PXL2 selected by the scan signals.

The timing controller 350 supplies the gate control signals GCS1 and GCS2 generated based on the timing signals supplied from an external source to the scan drivers 310, 313, and 315 and the emission control drivers 320, 323, and 325 through the first signal line SL1 and the second signal line SL2. The timing controller 350 supplies the data control signal DCS to the data driver 330 through the third signal line SL3. In addition, the timing controller 350 supplies the control signal LCS to the signal delay unit 340 through the operation control signal line SL10.

The start pulse and the clock signals are in each of the gate control signals GCS1 and CGS2. The start pulse controls the timing of the first scan signal or the first emission control signal. The clock signals are used to shift the start pulse. The source start pulse and the clock signals are in the data control signal DCS. The source start pulse controls the sampling start point of time of the data. The clock signals are used to control the sampling operation.

Figure 13:
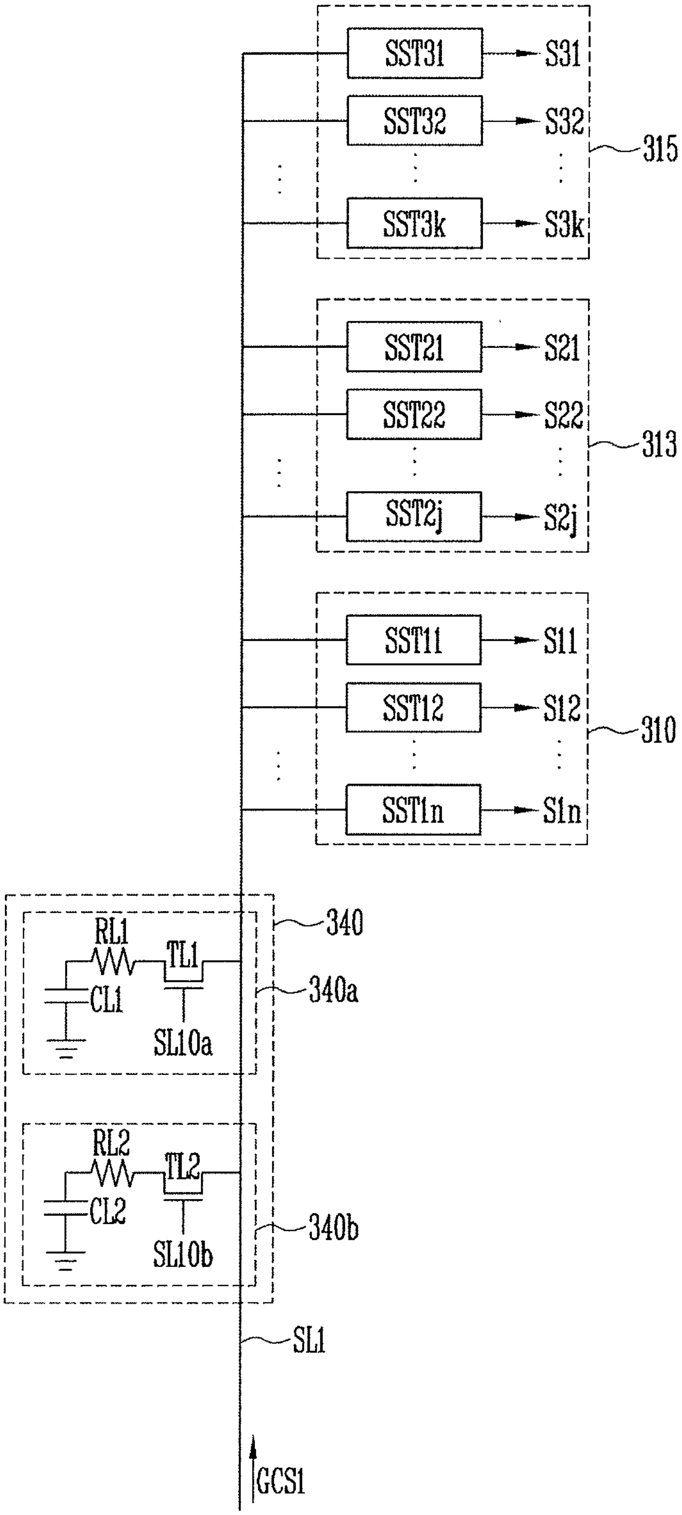
FIG. 13 illustrates another embodiment of scan stages and a signal delay unit.

FIG. 13 illustrates an embodiment of scan stages and a signal delay unit connected to the first signal line of FIG. 12. Referring to FIG. 13, the first scan driver 310, the second scan driver 313, the third scan driver 315, and the signal delay unit 340 may be connected to the first signal line SL1. The first signal line SL1 may supply the first gate control signal GCS1 to the first scan driver 310 through the third scan driver 315. The first scan driver 310 may be connected to one end of each of the first scan lines S11 through S1*n* and may supply the first scan signals to the first scan lines S11 through S1*n*. The first scan driver 310 may include the scan stages SST11 through SST1*n*.

Each of the scan stages SST11 through SST1*n* of the first scan driver 310 is connected to the one end of each of the first scan lines S11 through S1*n*. The scan stages SST11 through SST1*n* may respectively supply the first scan signals to the first scan lines S11 through S1*n*. At this time, the scan stages SST11 through SST1*n* may operate based on the first gate control signal GCS1 supplied through the first signal line SL1. In addition, the scan stages SST11 through SST1*n* may be implemented by the same circuit.

The second scan driver 313 may be connected to one end of each of the second scan lines S21 through S2*j* and may supply the second scan signals to the second scan lines S21 through S2*j*. The second scan driver 313 may include the scan stages SST21 through SST2*j*.

Each of the scan stages SST21 through SST2*j* of the second scan driver 313 is connected to one end of each of the first scan lines S21 through S2*j*. The scan stages SST21 through SST2*j* may supply the second scan signals to the second scan lines S21 through S2*j*. At this time, the scan stages SST21 through SST2*j* may operate based on the first gate control signal GCS1 supplied through the first signal line SL1. The scan stages SST21 through SST2*j* may be implemented by the same circuit. In addition, the scan stages SST11 through SST1*n* of the first scan driver 310 and the scan stages SST21 through SST2*j* of the second scan driver 313 may be implemented by the same circuit.

The third scan driver 315 may be connected to one end of each of the third scan lines S31 through S3*k* and may supply the third scan signals to the third scan lines S31 through S3*k*. The third scan driver 315 may include a plurality of scan stages SST31 through SST3*k*.

Each of the scan stages SST31 through SST3*j* of the third scan driver 315 is connected to one end of each of the third scan lines S31 through S3*k* and the scan stages SST31 through SST3*k* may supply the third scan signals to the third scan lines S31 through S3*k*. At this time, the scan stages SST31 through SST3*k* may operate based on the first gate control signal GCS1 supplied through the first signal line SL1.

The scan stages SST31 through SST3*k* may be implemented by the same circuit.

In addition, the scan stages SST11 through SST1*n* and SST21 through SST2*j* of the first scan driver 310 and the second scan driver 313 and the scan stages SST31 through SST3*k* of the third scan driver 315 may be implemented by the same circuit.

The signal delay unit 340 according to another embodiment may include a first signal delay unit 340*a* and a second signal delay unit 340*b*. The control signal line SL10 for supplying a signal for controlling an operation of the signal delay unit 340 may include a first control signal line SL10*a* connected to the first signal delay unit 340*a* and a second control signal line SL10*b* connected to the second signal delay unit 340*b*.

The first signal delay unit 340*a* may include the first signal delay control capacitor CL1, the first signal delay control resistor RL1, and the first signal delay control transistor TL1. The first electrode of the first signal delay control capacitor CL1 is connected to the ground and the second electrode of the first signal delay control capacitor CL1 may be connected to the first signal delay control resistor RL1.

The first electrode of the first signal delay control resistor RL1 is connected to the second electrode of the first signal delay control capacitor CL1 and the second electrode of the first signal delay control resistor RL1 may be connected to the first signal delay control transistor TL1.

The first electrode of the first signal delay control transistor TL1 is connected to the second electrode of the first signal delay control resistor RL1 and the second electrode of the first signal delay control transistor TL1 may be connected to the first signal line SL1. The gate electrode of the first signal delay control transistor TL1 may be connected to the first control signal line SL10*a*. The first signal delay control transistor TL1 may be turned on when a first control signal LCS1 is supplied to the first control signal line SL10*a* and may delay the first gate control signal GCS1 to correspond to a predetermined time constant $\tau 1$.

The time constant $\tau 1$ may be set in accordance with the resistance value of the first signal delay control resistor RL1 and the capacitance value of the first signal delay control capacitor CL1.

The second signal delay unit 340*b* may include a second signal delay control capacitor CL2, a second signal delay control resistor RL2, and a second signal delay control transistor TL2. A first electrode of the second signal delay control capacitor CL2 is connected to the ground and a second electrode of the second signal delay control capacitor CL2 may be connected to the second signal delay control resistor RL2. A first electrode of the second signal delay control resistor RL2 is connected to the second electrode of the second signal delay control capacitor CL2 and a second electrode of the second signal delay control resistor RL2 may be connected to the second signal delay control transistor TL2.

A first electrode of the second signal delay control transistor TL2 is connected to the second electrode of the second signal delay control resistor RL2 and a second electrode of the second signal delay control transistor TL2 may be connected to the first signal line SL1. A gate electrode of the second signal delay control transistor TL2 may be connected to the second control signal line SL10*b*. The second signal delay control transistor TL2 may be turned on when a second control signal LCS2 is supplied to the second control signal line SL10*b* and may delay the first gate control signal GCS1 by a value corresponding to a predetermined time constant $\tau 2$.

The time constant $\tau 2$ may be set in accordance with a resistance value of the second signal delay control resistor RL2 and a capacitance value of the second signal delay control capacitor CL2.

The first signal delay control transistor TL1 and the second signal delay control transistor TL2 may be turned on while the third scan driver 315 operates (that is, in a period in which the third scan signals are output).

Therefore, the first gate control signal GCS1 may be delayed by both the first signal delay unit 340*a* and the second signal delay unit 340*b*. For example, the scan stages SST31 through SST3*k* of the third scan driver 315 may operate to correspond to the delayed first gate control signal GCS1. Therefore, the third scan signals output from the third scan lines S31 through S3*k* may be delayed based on the delayed first gate control signal GCS1.

Next, while the second scan driver 313 operates, the first signal delay control transistor TL1 is turned on and the second signal delay control transistor TL2 may be turned off. Therefore the first gate control signal GCS1 may be delayed by the first signal delay unit 340*a*. For example, the scan stages SST21 through SST2*j* of the second scan driver 313 may operate based on the delayed first gate control signal GCS1. Therefore, the second scan signals output from the second scan lines S21 through S2*j* may be delayed based on the delayed first gate control signal GCS1.

On the other hand, since both the first signal delay unit 340*a* and the second signal delay unit 340*b* operate while the third scan driver 315 is driven and only the first signal delay unit 340*a* operates while the second scan driver 313 is driven, the first gate control signal GCS1 input to the scan stages SST31 through SST3*k* of the third scan driver 315 may be delayed more than the first gate control signal GCS1 input to the scan stages SST21 through SST2*j* of the second scan driver 313.

Since the loads of the second scan lines S21 through S2*j* are greater than the loads of the third scan lines S31 through S3*k*, the second scan signals may be similar to the third scan signals.

Finally, the first signal delay control transistor TL1 and the second signal delay control transistor TL2 may be turned off while the first scan driver 310 operates. Thus, the first gate control signal GCS1 that is not delayed may be input to the scan stages SST11 through SST1*n* of the first scan driver 310. The first scan signals delayed by the loads of the first scan lines S11 through S1*n* may be output. For example, although the first gate control signal GCS1 that is not delayed is input to the scan stages SST11 through SST1*n*, the first scan signals may be similar to the second scan signals and the third scan signals.

Figure 14:
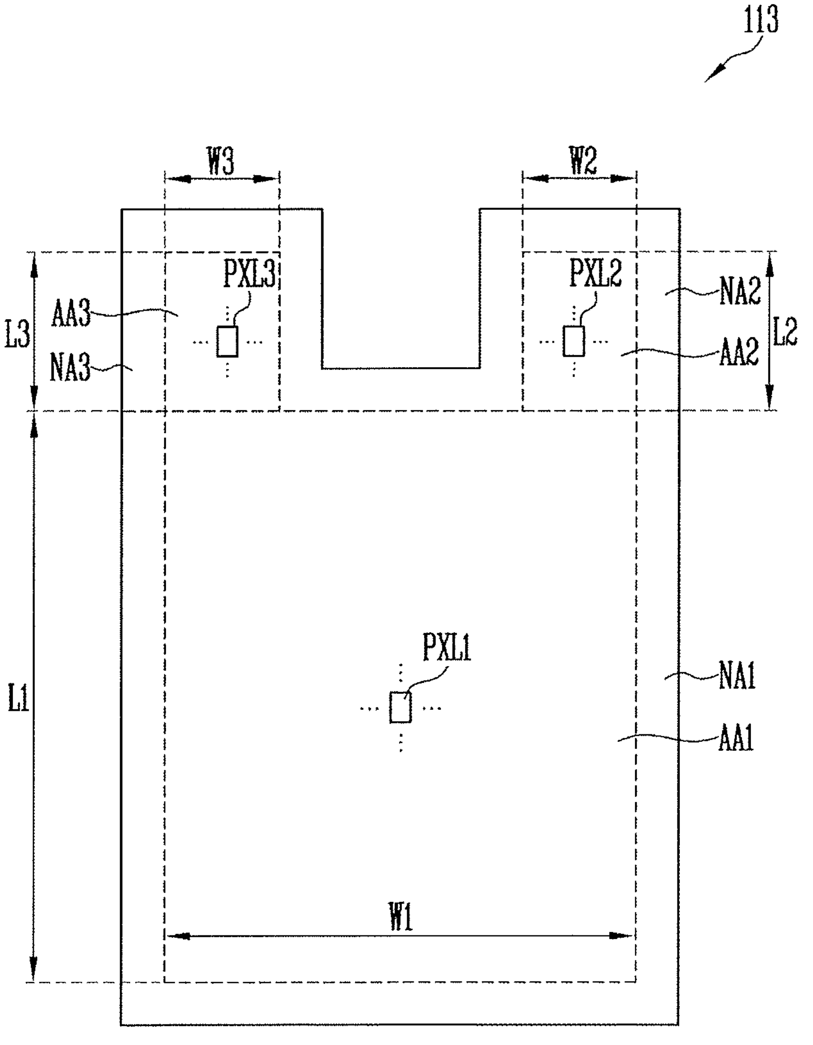
FIG. 14 illustrates another embodiment of a substrate.

FIG. 14 illustrates another embodiment of a substrate 113 which may include pixel regions and peripheral regions. The pixel regions AA1, AA2, and AA3 may include a first pixel region AA1, a second pixel region AA2, and a third pixel region AA3. The second pixel region AA2 and the third pixel region AA3 may be at one side of the first pixel region AA1. For example, the second pixel region AA2 and the third pixel region AA3 may be protrusions that extend from parts of an upper side of the first pixel region AA1. In addition, the second pixel region AA2 and the third pixel region AA3 may be separate from each other.

The first pixel region AA1 may have a greater area than the second pixel region AA2 and the third pixel region AA3. For example, the width W1 of the first pixel region AA1 may be greater than the width W2 of the second pixel region AA2 and the width W3 of the third pixel region AA3. The length L1 of the first pixel region AA1 may be greater than the length L2 of the second pixel region AA2 and the length L3 of the third pixel region AA3.

The second pixel region AA2 and the third pixel region AA3 may have the same area or different areas. For example, the width W2 of the second pixel region AA2 may be equal to or different from the width W3 of the third pixel region AA3. In addition, the length L2 of the second pixel region AA2 may be equal to or different from the length L3 of the third pixel region AA3.

The peripheral regions NA1, NA2, and NA3 may include a first peripheral region NA1, a second peripheral region NA2, and a third peripheral region NA3. The first peripheral region NA1 be around the first pixel region AA1 and may surround at least a part of the first pixel region AA1. The second peripheral region NA2 be around the second pixel region AA2 and may surround at least a part of the second pixel region AA2. The third peripheral region NA3 be around the third pixel region AA3 and may surround a part of the third pixel region AA3. The third peripheral region NA3 and the second peripheral region NA2 may or may not be connected in accordance with shapes of the substrate 113 and the pixel regions AA1, AA2, and AA3.

The pixels PXL1, PXL2, and PXL3 may include first pixels PXL1, second pixels PXL2, and third pixels PXL3. For example, the first pixels PXL1 are in the first pixel region AA1, the second pixels PXL2 are in the second pixel region AA2, and the third pixels PXL3 may be in the third pixel region AA3. In the first pixel region AA1, the same number of first pixels PXL1 may be in each horizontal line. In addition, in the second pixel region AA2, the same number of second pixels PXL2 may be in each horizontal line. In the third pixel region AA3, the same number of third pixels PXL3 may be in each horizontal line.

As described above, since the width W1 of the first pixel region AA1 is greater than the width W2 of the second pixel region AA2 and the width W3 of the third pixel region AA3, the number of first pixels PXL1 in the horizontal lines of the first pixel region AA1 may be greater than the number of second pixels PXL2 in the horizontal lines of the second pixel region AA2. In addition, the number of first pixels PXL1 in the horizontal lines of the first pixel region AA1 may be greater than the number of third pixels PXL3 in the horizontal lines of the third pixel region AA3. The substrate 113 may have various shapes so that the above-described pixel regions AA1, AA2, and AA3 and peripheral regions NA1, NA2, and NA3 may be set.

Figure 15:
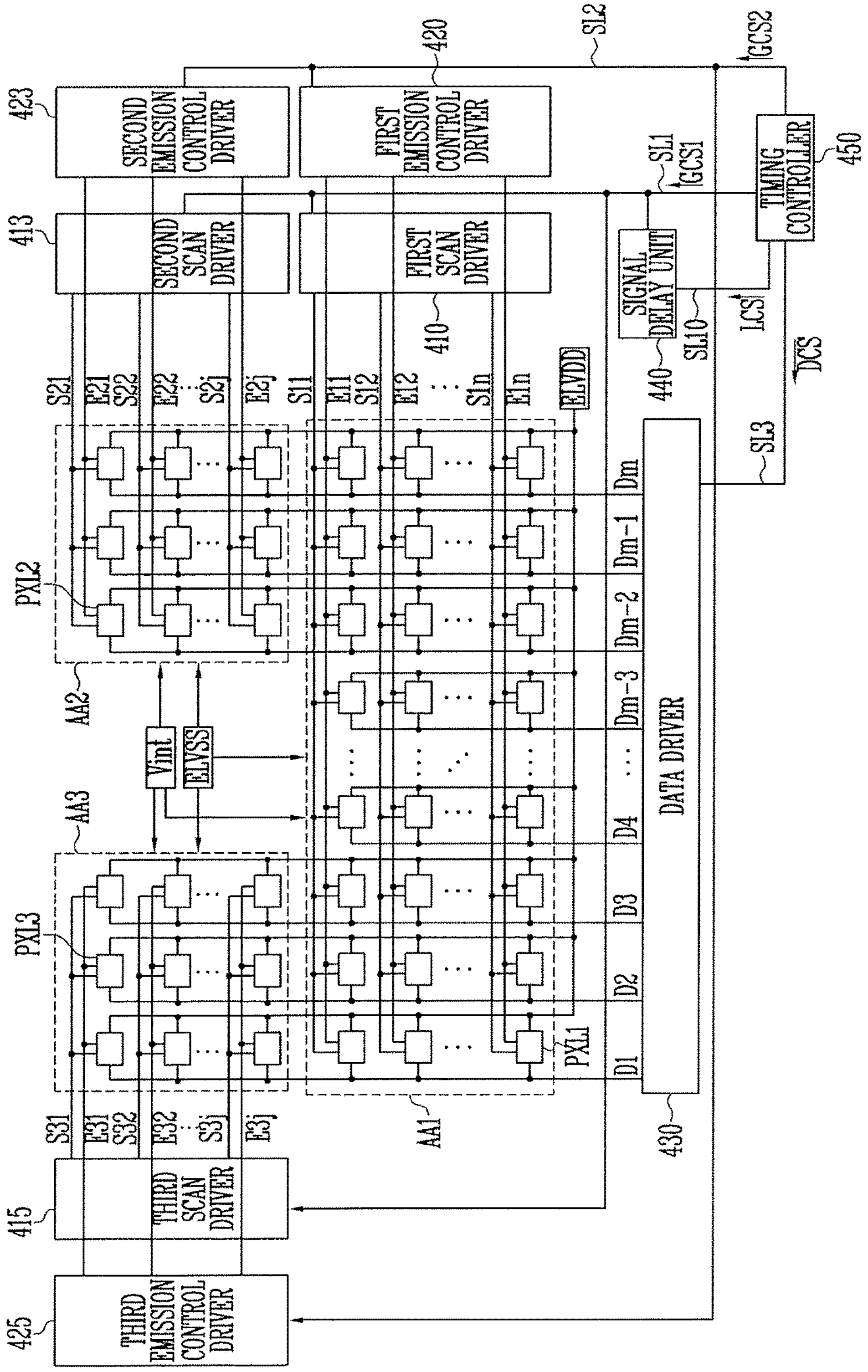
FIG. 15 illustrates another embodiment of a display device.

FIG. 15 illustrates another embodiment of a display device which may include the first pixels PXL1, the second pixels PXL2, the third pixels PXL3, a first scan driver 410, a first emission control driver 420, a second scan driver 413, a second emission control driver 423, a third scan driver 415, a third emission control driver 425, a data driver 430, a signal delay unit 440, and a timing controller 450.

The first pixels PXL1 are in the first pixel region AA1 divided by the first scan lines S11 through S1*n*, the first emission control lines E11 through E1*n*, and the data lines D1 through Dm. The first pixels PXL1 receive the data signals from the data lines D1 through Dm when the scan signals are supplied from the first scan lines S11 through S1*n*. The first pixels PXL1 that receive the data signals control the amount of current that flows from the first power source ELVDD to the second power source ELVSS via the OLEDs.

The second pixels PXL2 are in the second pixel region AA2 divided by the second scan lines S21 through S2*j*, the second emission control lines E21 through E2*j*, and the data lines Dm-2 through Dm. The second pixels PXL2 receive the data signals from the data lines Dm-2 through Dm when the scan signals are supplied from the second scan lines S21 through S2*j*. The second pixels PXL2 that receive the data signals control the amount of current that flows from the first power source ELVDD to the second power source ELVSS via the OLEDs.

The third pixels PXL3 are in the third pixel region AA3 divided by third scan lines S31 through S3*j*, second emission control lines E31 through E3*j*, and data lines D1 through D3. The third pixels PXL3 receive the data signals from the data lines D1 through D3 when scan signals are supplied from the third scan lines S31 through S3*j*. The third pixels PXL3 control the amount of current that flows from the first power source ELVDD to the second power source ELVSS via OLEDs.

The first scan driver 410 supplies the scan signals to the first scan lines S11 through S1*n* based on the first gate control signal GCS1 from the timing controller 450. For example, the first scan driver 410 may sequentially supply the scan signals to the first scan lines S11 through S1*n*. When the scan signals are sequentially supplied to the first scan lines S11 through S1*n*, the first pixels PXL1 are sequentially selected in units of horizontal lines.

The second scan driver 413 supplies the scan signals to the second scan lines S21 through S2*j* based on the first gate control signal GCS1 from the timing controller 450. For example, the second scan driver 413 may sequentially supply the scan signals to the second scan lines S21 through S2*j*. When the scan signals are sequentially supplied to the second scan lines S21 through S2*j*, the second pixels PXL2 are sequentially selected in units of horizontal lines.

The third scan driver 415 supplies the scan signals to the third scan lines S31 through S3*j* based on the first gate control signal GCS1 from the timing controller 450. For example, the third scan driver 415 may sequentially supply the scan signals to the third scan lines S31 through S3*j*. When the scan signals are sequentially supplied to the third scan lines S31 through S3*j*, the third pixels PXL3 are sequentially selected in units of horizontal lines.

The loads of the first scan lines S11 through S1*n* may be different from the loads of the second scan lines S21 through S2*j* and loads of the third scan lines S31 through S3*j*. Since the width W1 of the first pixel region AA1 is greater than the width W2 of the second pixel region AA2 and the width W3 of the third pixel region AA3, the length of the first scan lines S11 through S1*n* may be greater than the length of the second scan lines S21 through S2*j* and the length of the third scan lines S31 through S3*j*. Therefore, the loads of the first scan lines S11 through S1*n* may be greater than the loads of the second scan lines S21 through S2*j* and the loads of the third scan lines S31 through S3*j*.

As a result, differences in time constant may be generated among the scan signals supplied to the pixels PXL1, PXL2, and PXL3. Thus, the scan signals supplied to the first scan lines S11 through S1*n* have greater delay than the scan signals supplied to the second scan lines S21 through S2*j* and the third scan lines S31 through S3*j*. Brightness differences may be generated among the first pixels PXL1 through the third pixels PXL3 due to the differences in time constant among the scan signals.

The signal delay unit 440 according to the present embodiment may delay the first gate control signal GCS1 output from the timing controller 450 by a predetermined time constant and may transmit the delayed first gate control signal GCS1 to at least one of the scan drivers 410, 413, and 415. For example, the signal delay unit 440 may delay the first gate control signal GCS1 while the second scan driver 413 and the third scan driver 415 operate. In addition, the signal delay unit 440 may transmit the first gate control signal GCS1 output from the timing controller 450 as it is while the first scan driver 410 operates.

The first emission control driver 420 supplies the emission control signals to the first emission control lines E11 through E1*n* based on the second gate control signal GCS2 from the timing controller 450. For example, the first emission control driver 420 may sequentially supply the emission control signals to the first emission control lines E11 through E1*n*. The emission control signals are used to control the emission time of the first pixels PXL1. For this purpose, the emission control signals may have greater widths than the scan signals.

The second emission control driver 423 supplies the emission control signals to the second emission control lines E21 through E2*j*. For example, the second emission control driver 423 may sequentially supply the emission control signals to the second emission control lines E21 through E2*j*. The emission control signals are used to control the emission time of the second pixels PXL2. For this purpose, the emission control signals may be set to have greater widths than the scan signals.

The third emission control driver 425 supplies the emission control signals to the third emission control lines E31 through E3*j*. For example, the third emission control driver 425 may sequentially supply the emission control signals to the third emission control lines E31 through E3*j*. The emission control signals are used to control the emission time of the third pixels PXL3. For this purpose, the emission control signals may be set to have greater widths than the scan signals.

On the other hand, the emission control signals are set to have gate-off voltages (for example, high voltages) to turn off transistors in the pixels PXL1, PXL2, and PXL3. The scan signals may have gate-on voltages (for example, low voltages) to turn on the transistors in the pixels PXL1, PXL2, and PXL3.

The data driver 430 supplies the data signals to the data lines D1 through Dm based on the data control signal DCS. The data signals supplied to the data lines D1 through Dm are supplied to the pixels PXL1 and PXL2 selected by the scan signals.

The timing controller 450 supplies the gate control signals GCS1 and GCS2 generated based on the timing signals supplied from the outside to the scan drivers 410, 413, and 415 and the emission control drivers 420, 423, and 425 and supplies the data control signal DCS to the data driver 430.

The start pulse and the clock signals are in each of the gate control signals GCS1 and CGS2. The start pulse controls the timing of the first scan signal or the first emission control signal. The clock signals are used for shifting the start pulse. The source start pulse and the clock signals are in the data control signal DCS. The source start pulse controls the sampling start point of time of the data. The clock signals are used to control the sampling operation.

In some embodiments, the substrates 110, 111, 112, and 113 have angulate edges. In another embodiments, substrates 110, 111, 112, and 113 may have at least some edges that are round.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The drivers, controllers, and other processing features described herein may be implemented in logic which, for example, may include hardware, software, or both. When implemented at least partially in hardware, the drivers, controllers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the drivers, controllers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the embodiments in the claims.

What is claimed is:

1. A display device, comprising:

first pixels in a first pixel region and connected to first scan lines;

second pixels in a second pixel region having a width less than the first pixel region, the second pixels connected to second scan lines;

a first scan driver to supply first scan signals to the first scan lines in a first scan period;

a second scan driver to supply second scan signals to the second scan lines in a second scan period;

a first signal line, connected to the first scan driver and the second scan driver, to supply a first driving signal to the first scan driver and the second scan driver;

a data driver to supply data signals to the first pixels and the second pixels through data lines; and a signal delay circuit to delay the first driving signal in the second scan period and not to delay the first driving signal in the first scan period.

2. The display device as claimed in claim 1, wherein a number of second pixels in horizontal lines of the second pixel region is less than a number of first pixels in horizontal lines of the first pixel region.

3. The display device as claimed in claim 1, wherein a length of the second scan lines is less than a length of the first scan lines.

4. The display device as claimed in claim 1, wherein the first driving signal includes at least one clock signal.

5. The display device as claimed in claim 4, wherein:
- the first signal line includes a first clock signal line and a second clock signal line, and
- the first clock signal line and the second clock signal line are connected to the signal delay circuit.

6. The display device as claimed in claim 1, wherein the signal delay circuit includes:
- a signal delay circuit element; and
- a signal delay control transistor to control electrical connection between the signal delay circuit element and the first signal line.

7. The display device as claimed in claim 6, wherein the signal delay circuit element includes at least one of a resistor or a capacitor.

8. The display device as claimed in claim 7, wherein the signal delay control transistor turns on and off based on a control signal from a timing controller.

9. The display device as claimed in claim 7, wherein the signal delay control transistor maintains an on state in a first period in which the second scan signals are supplied and maintains an off state in a second period in which the first scan signals are supplied.

10. The display device as claimed in claim 9, wherein:
- the first scan driver supplies the first scan signals to the first scan lines based on the first driving signal in the second period, and
- the second scan driver supplies the second scan signals to the second scan lines based on the first driving signal delayed in the first period.

11. The display device as claimed in claim 6, further comprising:
- third pixels in a third pixel region and connected to third scan lines; and
- a third scan driver, connected to the first signal line, to receive the first driving signal and to supply third scan signals to the third scan lines.

12. The display device as claimed in claim 11, wherein:
- the third pixel region has a width less than the first pixel region, and
- the second pixel region and the third pixel region are at one side of the first pixel region and separate from each other.

13. The display device as claimed in claim 12, wherein the signal delay control transistor maintains an on state in a first period in which the second scan signals and the third scan signals are supplied and maintains an off state in a second period in which the first scan signals are supplied.

14. A display device, comprising:
- first pixels in a first pixel region and connected to first scan lines;
- second pixels in a second pixel region having a width less than the first pixel region, the second pixels are connected to second scan lines;
- third pixels in a third pixel region having a width less than the second pixel region, the third pixels connected to third scan lines;
- a first scan driver to supply first scan signals to the first scan lines in a first scan period;
- a second scan driver to supply second scan signals to the second scan lines in a second scan period;
- a third scan driver to supply third scan signals to the third scan lines;
- a first signal line, connected to the first scan driver, the second scan driver, and the third scan driver, to supply a first driving signal to the first scan driver, the second scan driver, and the third scan driver;
- a data driver to supply data signals to the first pixels and the second pixels through data lines; and
- a first signal delay circuit and a second signal delay circuit to delay the first driving signal in the second scan period and not to delay the first driving signal in the first scan period.

15. The display device as claimed in claim 14, wherein the first signal delay circuit and the second signal delay circuit operate in a first period in which the third scan signals are supplied.

16. The display device as claimed in claim 14, wherein the first signal delay circuit operates and the second signal delay circuit stops operating in a second period in which the second scan signals are supplied.

17. The display device as claimed in claim 14, wherein:
- a number of third pixels in horizontal lines of the third pixel region is less than a number of second pixels in horizontal lines of the second pixel region, and
- a number of second pixels in horizontal lines of the second pixel region is less than a number of first pixels provided in horizontal lines of the first pixel region.

18. The display device as claimed in claim 14, wherein:
- a length of the third scan lines is less than a length of the second scan lines, and a length of the second scan lines is less than a length of the first scan lines.

19. The display device as claimed in claim 14, wherein:
- the first signal delay circuit includes a first signal delay circuit element and a first signal delay control transistor to control electrical connection between the first signal delay circuit element and the first signal line, and
- the second signal delay circuit includes a second signal delay circuit element and a second signal delay control transistor to control electrical connection between the second signal delay circuit element and the first signal line.

20. The display device as claimed in claim 19, wherein each of the first signal delay circuit element and the second signal delay circuit element includes at least one of a resistor or a capacitor.

21. The display device as claimed in claim 19, wherein the first signal delay control transistor and the second signal delay control transistor maintain on states in a first period in which the third scan signals are supplied.

22. The display device as claimed in claim 21, wherein the first signal delay control transistor maintains an on state and the second signal delay control transistor maintains an off state in a second period in which the second scan signals are supplied.

23. The display device as claimed in claim 22, wherein the first signal delay control transistor and the second signal delay control transistor maintain off states in a third period in which the first scan signals are supplied.

24. The display device as claimed in claim 23, wherein the first period, the second period, and the third period are sequential periods.

25. The display device as claimed in claim 1, wherein:
- the signal delay circuit is electrically connected to the first signal line to delay the first driving signal while the second scan signals are supplied to the second scan lines, and the signal delay circuit is electrically separated from the first signal line so as not to delay the first driving signal while the first scan signals are supplied to the first scan lines.

* * * * *